US009853877B2

(12) United States Patent
Manghirmalani et al.

(10) Patent No.: US 9,853,877 B2
(45) Date of Patent: Dec. 26, 2017

(54) METHOD FOR OPTIMIZED PLACEMENT OF SERVICE-CHAIN-MONITORING PROBES

(71) Applicant: Telefonaktiebolaget L M Ericsson (publ), Stockholm (SE)

(72) Inventors: Ravi Manghirmalani, Fremont, CA (US); Heikki Mahkonen, San Jose, CA (US); Ming Xia, San Jose, CA (US); Meral Shirazipour, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 187 days.

(21) Appl. No.: 14/745,058

(22) Filed: Jun. 19, 2015

(65) Prior Publication Data

US 2016/0294664 A1    Oct. 6, 2016

Related U.S. Application Data

(60) Provisional application No. 62/140,936, filed on Mar. 31, 2015.

(51) Int. Cl.
*H04L 12/26* (2006.01)
*H04W 28/26* (2009.01)
*H04W 28/00* (2009.01)

(52) U.S. Cl.
CPC ............. *H04L 43/12* (2013.01); *H04L 43/10* (2013.01); *H04W 28/00* (2013.01); *H04W 28/26* (2013.01)

(58) Field of Classification Search
CPC ..... H04L 41/5003; H04L 43/10; H04L 43/12; H04W 28/00; H04W 28/26
See application file for complete search history.

(56) References Cited

U.S. PATENT DOCUMENTS 8,984,490 B1    3/2015  Dahan
9,009,305 B1*   4/2015  Callau ................ H04L 29/06
                                                 370/230

(Continued)

OTHER PUBLICATIONS

Bitar, et al., "Interface to the Routing System (I2RS) for Service Chaining: Use Cases and Requirements," draft-bitar-i2rs-service-chaining-01, Internet Engineering Task Force, I2RS Working Group, IETF Trust, Feb. 14, 2014, pp. 1-15.

(Continued)

*Primary Examiner* — Jeong S Park
(74) *Attorney, Agent, or Firm* — Nicholson De Vos Webster & Elliott LLP

(57) ABSTRACT

Exemplary methods include receiving requests comprising of monitoring zones (MZs), each MZ to be allocated a pair of probes in a network, wherein each MZ is associated with a rule identifying a condition for when its probes are to be updated, and wherein each probe in the network is associated with a rule identifying a condition of when it is updated. The methods include determining whether previously allocated pairs of probes in the network can serve as probes for one or more MZs in the requests, wherein a previously allocated pair of probes can serve as probes for a MZ if a rule associated with the MZ is similar to rules associated with the previously allocated pair of probes. The methods include for each MZ that can be served by a previously allocated pair of probes, sending information identifying the MZ and the previously allocated pair of probes.

30 Claims, 15 Drawing Sheets

(56) References Cited

U.S. PATENT DOCUMENTS

| | | | | |
|---|---|---|---|---|
| 9,471,391 | B1* | 10/2016 | Abramson | G06F 9/5072 |
| 2007/0177518 | A1* | 8/2007 | Li | H04L 43/50 |
| | | | | 370/252 |
| 2008/0232269 | A1 | 9/2008 | Tatman et al. | |
| 2009/0135727 | A1* | 5/2009 | Agrawal | H04L 41/0677 |
| | | | | 370/248 |
| 2010/0030792 | A1* | 2/2010 | Swinton | G06Q 30/00 |
| | | | | 705/14.54 |
| 2013/0132564 | A1 | 5/2013 | Ciordas et al. | |
| 2014/0289412 | A1* | 9/2014 | Doddavula | H04L 41/5003 |
| | | | | 709/226 |
| 2016/0006640 | A1* | 1/2016 | Masuda | G06F 11/3495 |
| | | | | 709/224 |

OTHER PUBLICATIONS

Dunbar, et al., "An Information Model for Filter Rules for Discovery and Traffic for I2RS Filter-Based RIB," draft-dunbar-i2rs-discover-traffic-rules-00, Internet Engineering Task Force, I2RS Working Group, IETF Trust, Mar. 24, 2015, pp. 1-25.

Halpern, et al.k, "Service Function Chaining (SFC) Architecture", IETF Standrads Track draft, Work in Progress, draft-ietf-sfc-architecture-05, http://tools.ietf.org/html/draft-ietf-sfc-architecture-05, (Feb. 17, 2015), 27 pages.

Kazemian, et al., "Real time network policy checking using header space analysis," USENIX Association, 10th USENIX Symposium on Networked Systems Design and Implementation (NSDI '13), https://www.usenix.org/system/files/conference/nsdi13/nsdi13-final8.pdf, (2013), pp. 99-111.

* cited by examiner

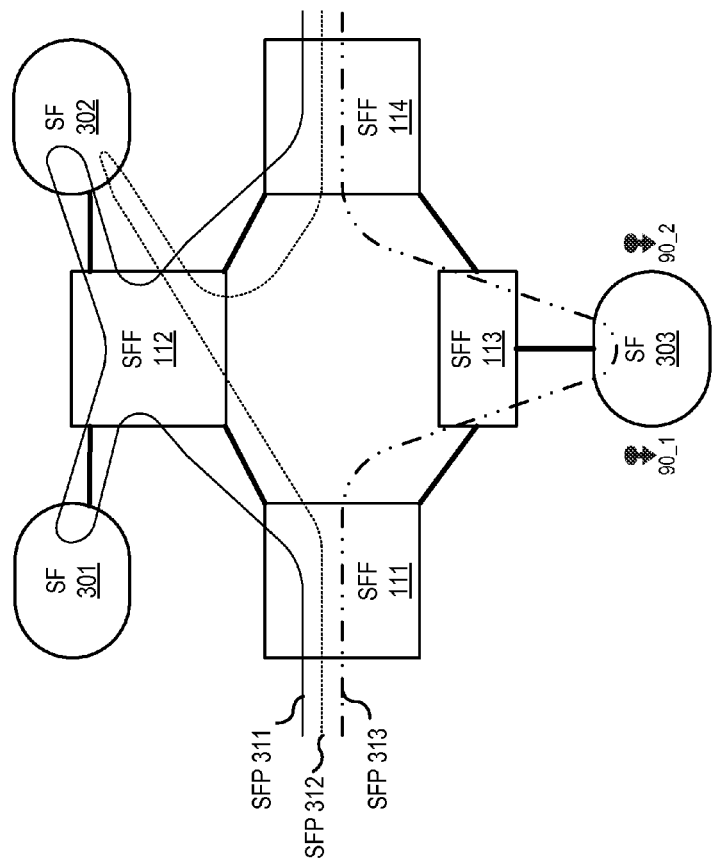
FIG. 3-A

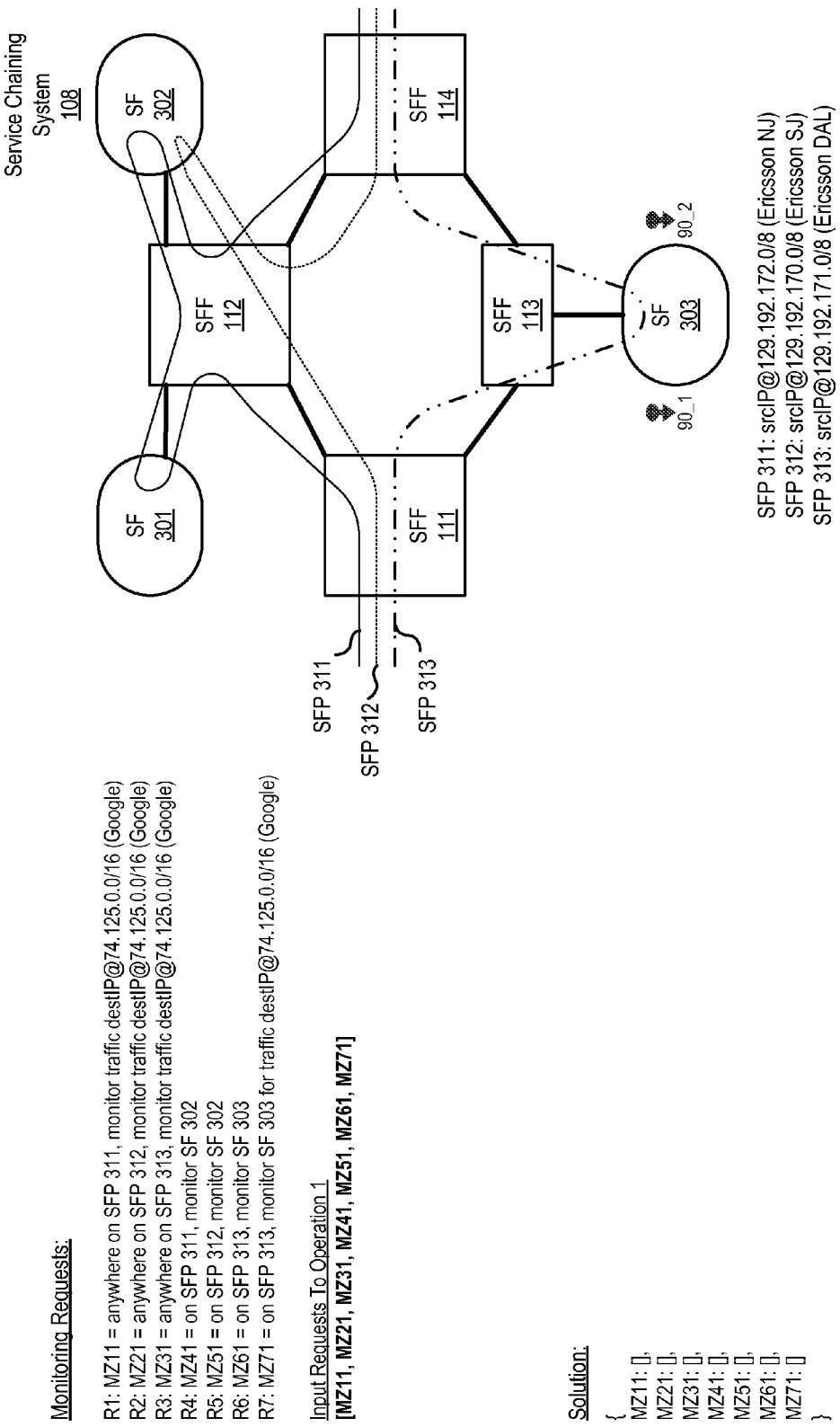

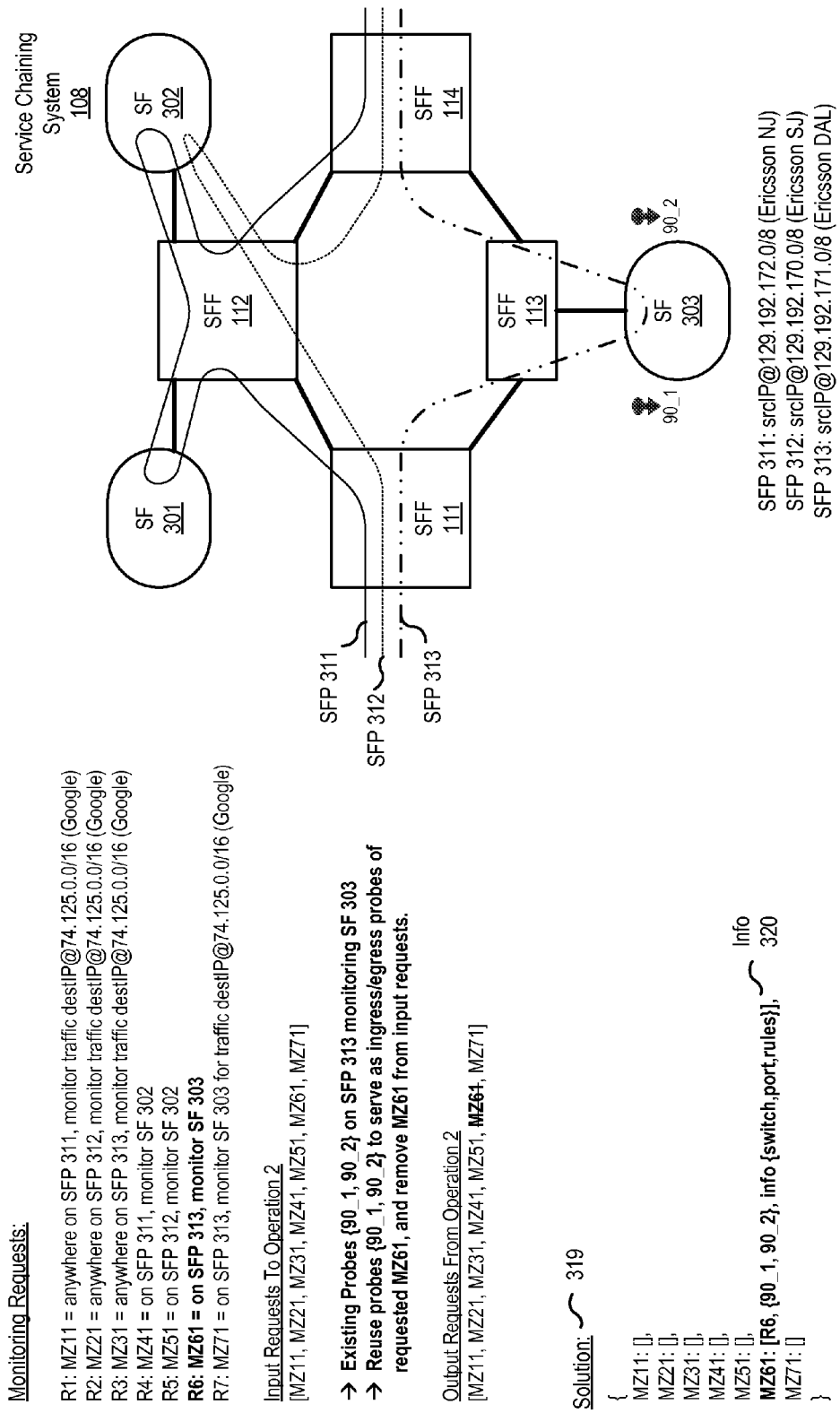
FIG. 3-C (Operation 2)

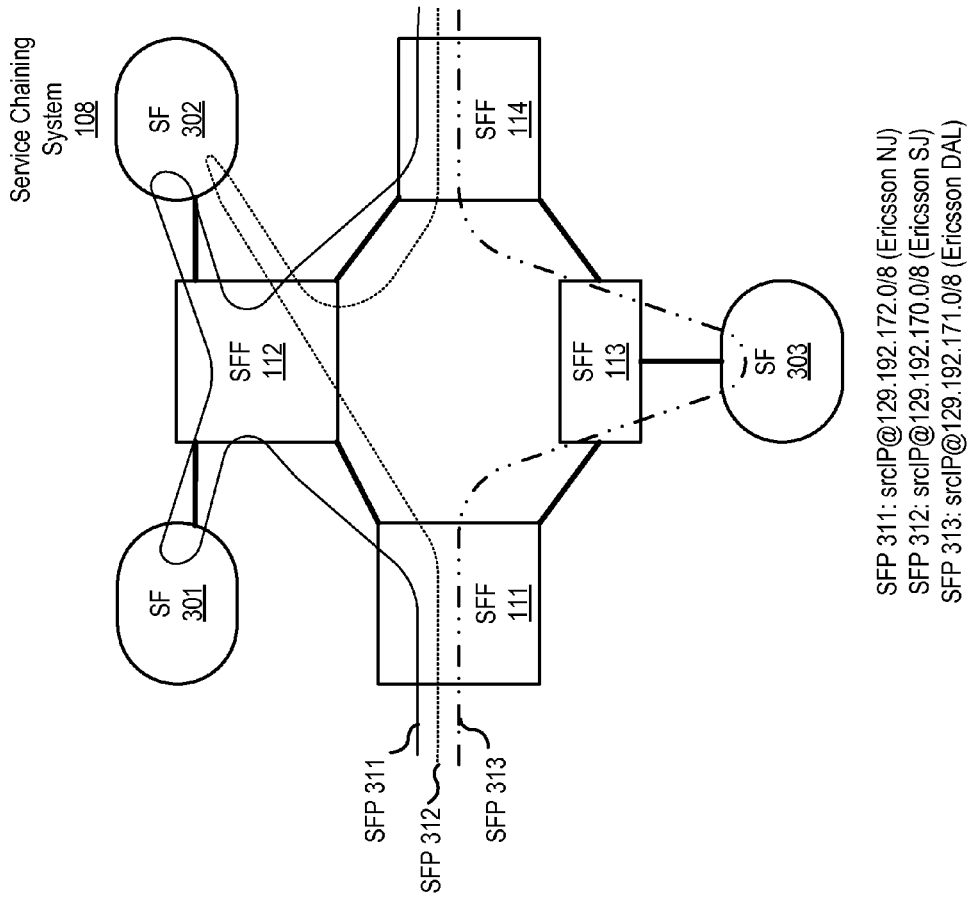

Monitoring Requests:

R1: MZ11 = anywhere on SFP 311, monitor traffic destIP@74.125.0.0/16 (Google)
R2: MZ21 = anywhere on SFP 312, monitor traffic destIP@74.125.0.0/16 (Google)
R3: MZ31 = anywhere on SFP 313, monitor traffic destIP@74.125.0.0/16 (Google)
R4: MZ41 = on SFP 311, monitor SF 302
R5: MZ51 = on SFP 312, monitor SF 302
R6: MZ61 = on SFP 313, monitor SF 303
R7: MZ71 = on SFP 313, monitor SF 303 for traffic destIP@74.125.0.0/16 (Google)

Input Requests To Operation 4
[MZ11, MZ21, MZ31, MZ41, MZ51, MZ64, MZ71]

→ Identify probes in the remaining input request that can be consolidated
→ Probes {31_4, 31_5} can be consolidated
  with probes {71_1, 71_2}; Thus, MZ31 and MZ71 can be consolidated.
→ Add all probes that can be consolidated into first set of MZs,
  and the rest into second set of MZs.
→ Probe first set of MZs = [MZ31, MZ71]
   Probe second set of MZs = [MZ11, MZ21, MZ41, MZ51]

Output Requests From Operation 4
First set of MZs = [MZ31, MZ71]    Set 321
Second set of MZs = [MZ11, MZ21, MZ41, MZ51]    Set 322

Solution:
{
MZ11: [],
MZ21: [],
MZ31: [],
MZ41: [],
MZ51: [],
MZ61: [R6, {90_1, 90_2}, info {switch,port,rules}],
MZ71: []
}

SFP 311: srcIP@129.192.172.0/8 (Ericsson NJ)
SFP 312: srcIP@129.192.170.0/8 (Ericsson SJ)
SFP 313: srcIP@129.192.171.0/8 (Ericsson DAL)

Note:  = Probe, where m = MZ #, and n = probe #
       m_n

FIG. 3-D (Operation 4)

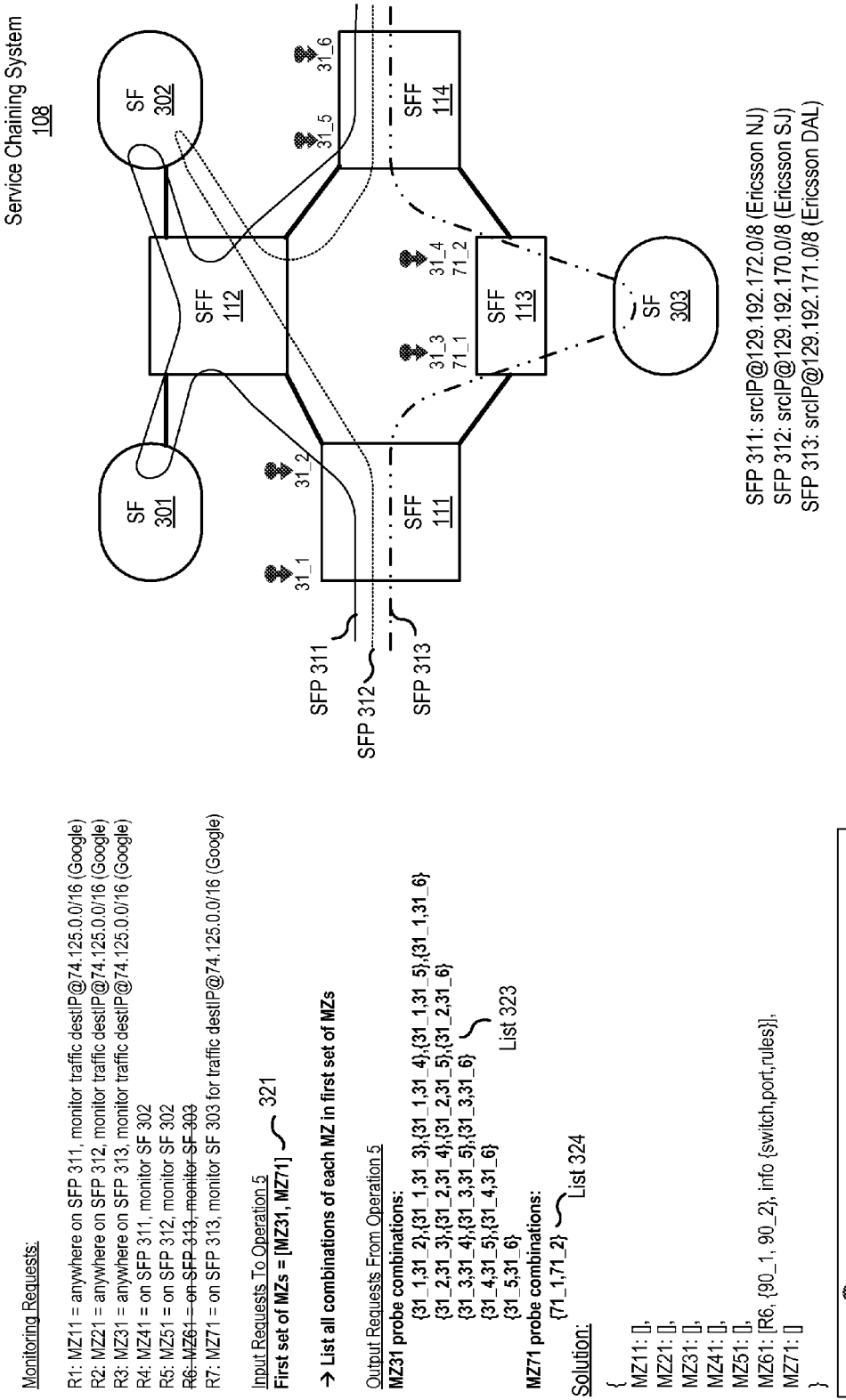
FIG. 3-E (Operation 5)

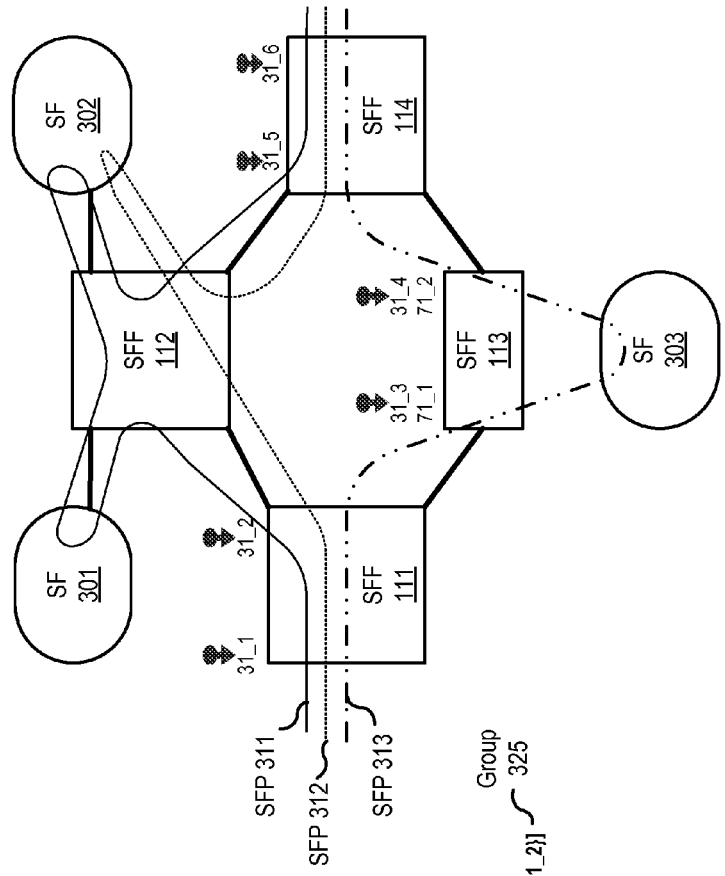

Service Chaining System 108

SFP 311: srcIP@129.192.172.0/8 (Ericsson NJ)
SFP 312: srcIP@129.192.170.0/8 (Ericsson SJ)
SFP 313: srcIP@129.192.171.0/8 (Ericsson DAL)

FIG. 3-F (Operation 6)

Monitoring Requests:

R1: MZ11 = anywhere on SFP 311, monitor traffic destIP@74.125.0.0/16 (Google)
R2: MZ21 = anywhere on SFP 312, monitor traffic destIP@74.125.0.0/16 (Google)
R3: MZ31 = anywhere on SFP 313, monitor traffic destIP@74.125.0.0/16 (Google)
R4: MZ41 = on SFP 311, monitor SF 302
R5: MZ51 = on SFP 312, monitor SF 302
R6: MZ61 = on SFP 313, monitor SF 303
R7: MZ71 = on SFP 313, monitor SF 303 for traffic destIP@74.125.0.0/16 (Google)

Input Requests To Operation 6
MZ31 probe combinations:
{31_1,31_2}; {31_1,31_3}; {31_1,31_4}; {31_1,31_5}; {31_1,31_6}
{31_2,31_3}; {31_2,31_4}; {31_2,31_5}; {31_2,31_6}
{31_3,31_4}; {31_3,31_5}; {31_3,31_6}
{31_4,31_5}; {31_4,31_6}
{31_5,31_6} — List 323

MZ71 probe combinations:
{71_1,71_2} — List 324

→ List all possible combinations (cross product) of MZs in first set of MZs leading to a solution: [MZ31,MZ71]

Output Requests From Operation 6
[{31_1,31_2}{71_1,71_2}], [{31_1,31_3}{71_1,71_2}],...,[{31_5,31_6}{71_1,71_2}]

Solution:
{
MZ11: [],
MZ21: [],
MZ31: [],
MZ41: [],
MZ51: [],
MZ61: [R6, {90_1, 90_2}, info {switch,port,rules}],
MZ71: []
}

Note:  = Probe, where m = MZ #, and n = probe #
         m_n

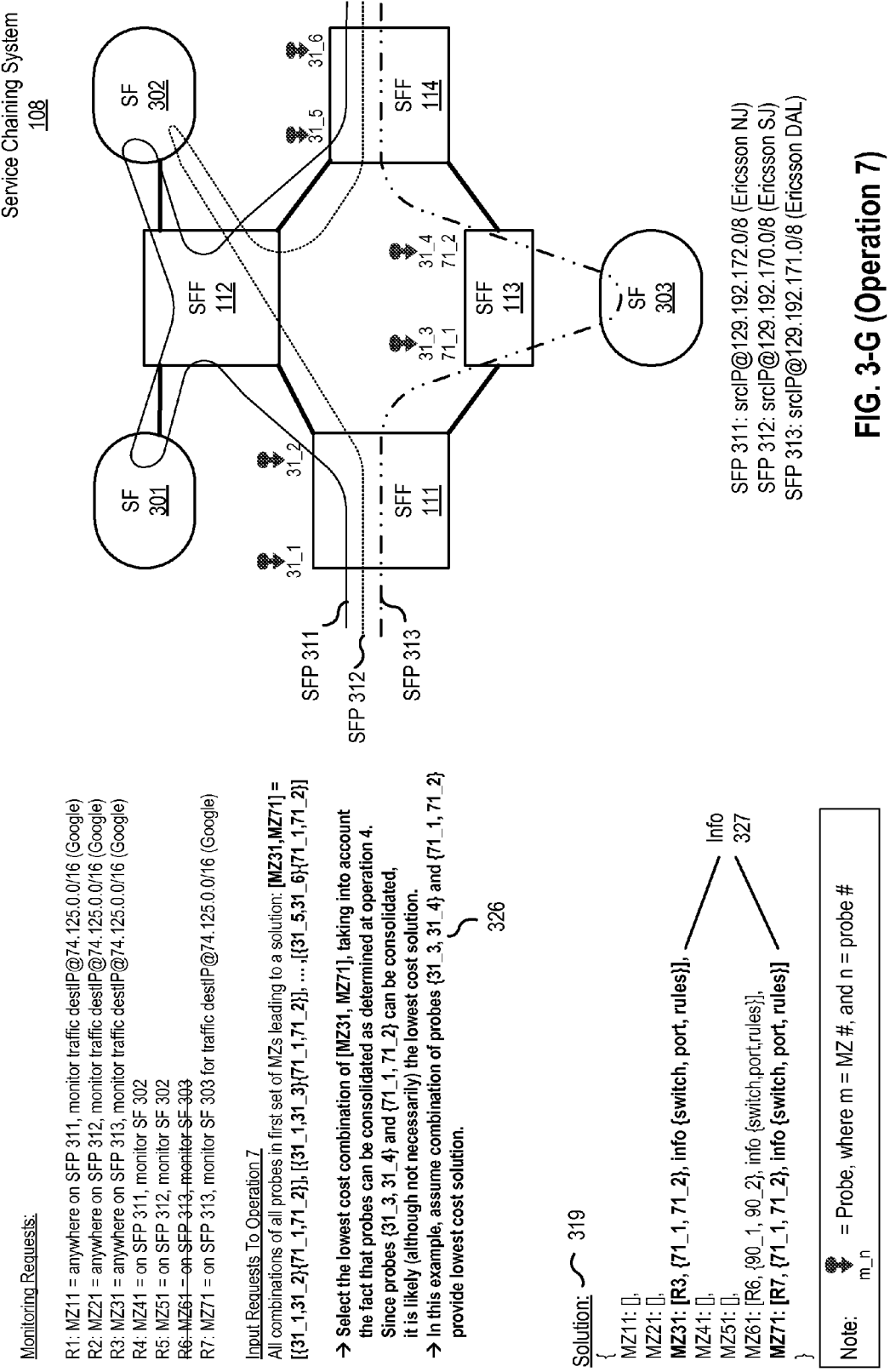
FIG. 3-G (Operation 7)

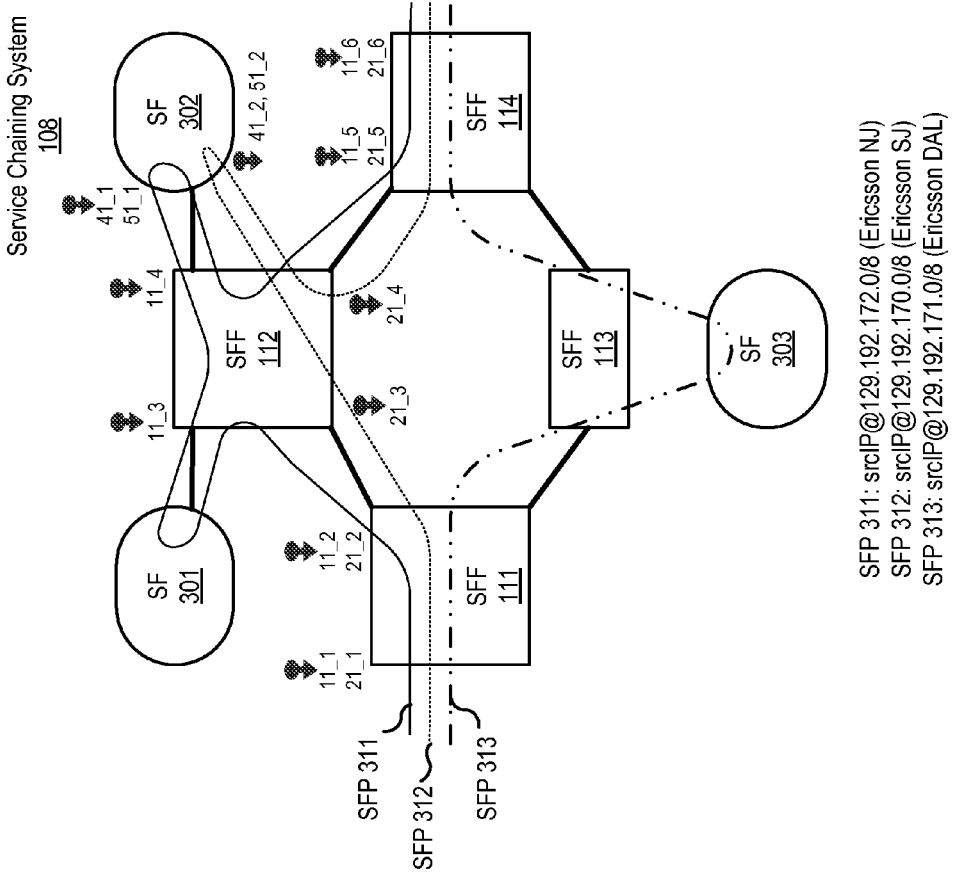

FIG. 3-H (Operation 8)

Monitoring Requests:

R1: MZ11 = anywhere on SFP 311, monitor traffic destIP@74.125.0.0/16 (Google)
R2: MZ21 = anywhere on SFP 312, monitor traffic destIP@74.125.0.0/16 (Google)
R3: MZ31 = anywhere on SFP 313, monitor traffic destIP@74.125.0.0/16 (Google)
R4: MZ41 = on SFP 311, monitor SF 302
R5: MZ51 = on SFP 312, monitor SF 302
R6: MZ61 = on SFP 313, monitor SF 303
R7: MZ71 = on SFP 313, monitor SF 303 for traffic destIP@74.125.0.0/16 (Google)

Input Requests To Operation 8
Second set of MZs = [MZ11, MZ21, MZ41, MZ51] ~ Set 322
→ List all combinations of each MZ in second set of MZs Output Requests From Operation 8

MZ11 probe combinations: {11_1,11_2}, ..., {11_5,11_6} ~ List 328
MZ21 probe combinations: {21_1,21_2}, ..., {21_5,21_6} ~ List 329
MZ41 probe combinations: {41_1,41_2} ~ List 333
MZ51 probe combinations: {51_1,51_2} ~ List 334

Solution:
{
MZ11: [],
MZ21: [],
MZ31: [R3, {71_1, 71_2}, info {switch, port, rules}],
MZ41: [],
MZ51: [],
MZ61: [R6, {90_1, 90_2}, info {switch,port,rules}],
MZ71: [R7, {71_1, 71_2}, info {switch, port, rules}]
}

SFP 311: srcIP@129.192.172.0/8 (Ericsson NJ)
SFP 312: srcIP@129.192.170.0/8 (Ericsson SJ)
SFP 313: srcIP@129.192.171.0/8 (Ericsson DAL)

Note: 🐾 m_n = Probe, where m = MZ #, and n = probe #

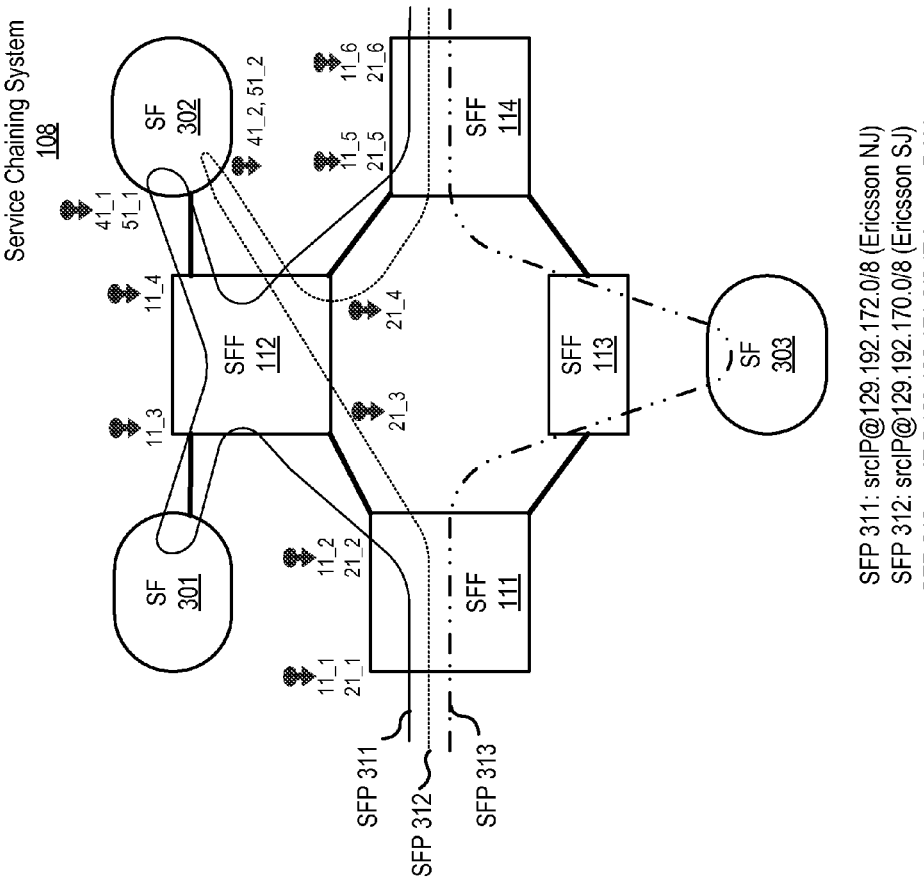

FIG. 3-I (Operation 9)

Monitoring Requests:
R1: MZ11 = anywhere on SFP 311, monitor traffic destIP@74.125.0.0/16 (Google)
R2: MZ21 = anywhere on SFP 312, monitor traffic destIP@74.125.0.0/16 (Google)
R3: MZ31 = anywhere on SFP 313, monitor traffic destIP@74.125.0.0/16 (Google)
R4: MZ41 = on SFP 311, monitor SF 302
R5: MZ51 = on SFP 312, monitor SF 302
R6: MZ61 = on SFP 313, monitor SF 303
R7: MZ71 = on SFP 313, monitor SF 303 for traffic destIP@74.125.0.0/16 (Google)

Input Requests To Operation 9
MZ11 probe combinations: {11_1,11_2}, ..., {11_5,11_6}  ← List 328
MZ21 probe combinations: {21_1,21_2}, ..., {11_5,11_6}  ← List 329
MZ41 probe combinations: {41_1,41_2}  ← List 333
MZ51 probe combinations: {41_1,41_2}  ← List 334

→ List all possible combinations (cross product) of all MZs in second set of MZs leading to a
  solution: [MZ11,MZ21,MZ41,MZ51]

Output Requests From Operation 9
[{11_1,11_2}{21_1,21_2}{41_1,41_2}{41_1,41_2},...,
 {11_5,11_6}{11_5,11_6}{41_1,41_2}{41_1,41_2}]  ← Group 330

Solution:
{
MZ11: [],
MZ21: [],
MZ31: [R3, {71_1, 71_2}, info {switch, port, rules}],
MZ41: [],
MZ51: [],
MZ61: [R6, {90_1, 90_2}, info {switch,port,rules}],
MZ71: [R7, {71_1, 71_2}, info {switch, port, rules}]
}

Note:  🐾 = Probe, where m = MZ #, and n = probe #
       m_n

SFP 311: srcIP@129.192.172.0/8 (Ericsson NJ)
SFP 312: srcIP@129.192.170.0/8 (Ericsson SJ)
SFP 313: srcIP@129.192.171.0/8 (Ericsson DAL)

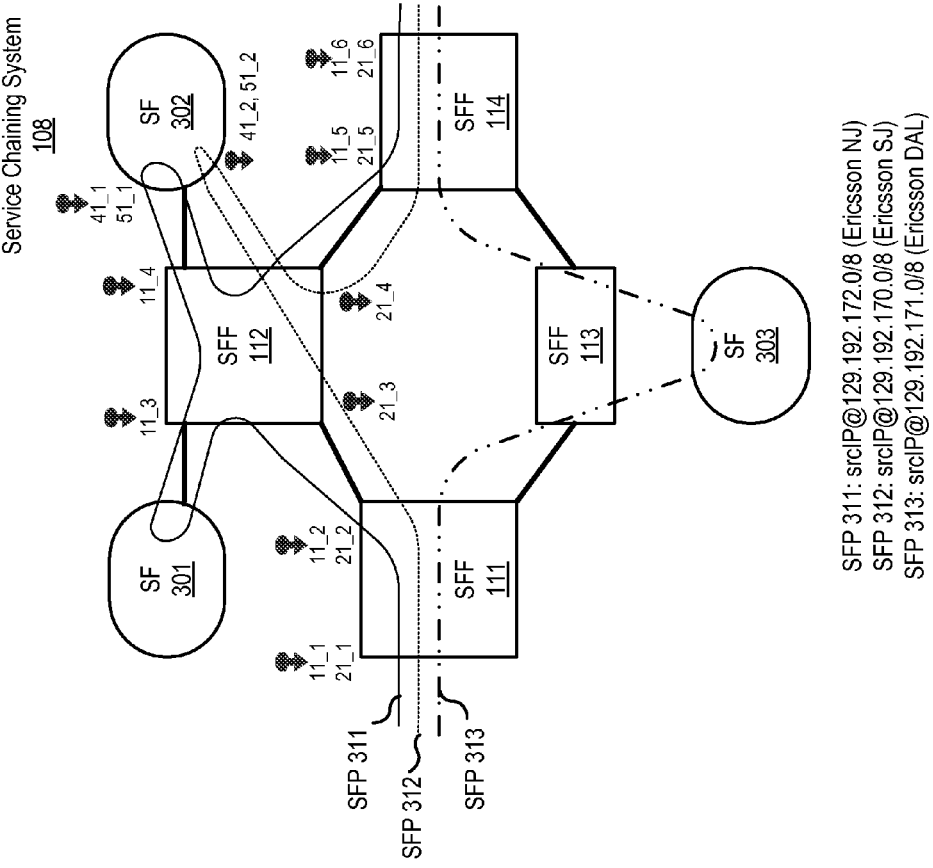

FIG. 3-J (Operation 11)

SFP 311: srcIP@129.192.172.0/8 (Ericsson NJ)
SFP 312: srcIP@129.192.170.0/8 (Ericsson SJ)
SFP 313: srcIP@129.192.171.0/8 (Ericsson DAL)

Monitoring Requests:

R1: MZ11 = anywhere on SFP 311, monitor traffic destIP@74.125.0.0/16 (Google)
R2: MZ21 = anywhere on SFP 312, monitor traffic destIP@74.125.0.0/16 (Google)
R3: MZ31 = anywhere on SFP 313, monitor traffic destIP@74.125.0.0/16 (Google)
R4: MZ41 = on SFP 311, monitor SF 302
R5: MZ51 = on SFP 312, monitor SF 302
R6: MZ61 = on SFP 313, monitor SF 303
R7: MZ71 = on SFP 313, monitor SF 303 for traffic destIP@74.125.0.0/16 (Google)

Input Requests To Operation 10
All combinations of all probes in second set of MZs leading to a solution:
[MZ11,MZ21,MZ41,MZ51] =
[{11_1,11_2}{21_1,21_2}{41_1,41_2}{41_1,41_2},....
{11_5,11_6}{11_5,11_6}{41_1,41_2}{41_1,41_2}]

→ Select the lowest cost combination of [MZ11,MZ21,MZ41,MZ51]
→ In this example, assume probe combination: 331
{11_1,11_2}{21_1,21_2}{41_1,41_2}{41_1,41_2}
provides lowest cost solution.

Solution: 319
{
MZ11: [R1, {11_1, 11_2}, info (switch, port, rules)],
MZ21: [R2, {21_1, 21_2}, info (switch, port, rules)],
MZ31: [R3, {7_1, 7_2}, info {switch, port, rules}],
MZ41: [R4, {41_1, 41_2}, info (switch, port, rules)],       Info
MZ51: [R5, {51_1, 51_2}, info (switch, port, rules)],       332
MZ61: [R6, {90_1, 90_2}, info {switch,port,rules}],
MZ71: [R7, {71_1, 71_2}, info {switch, port, rules}]
}

Note: 🐾 = Probe, where m = MZ #, and n = probe #
      m_n

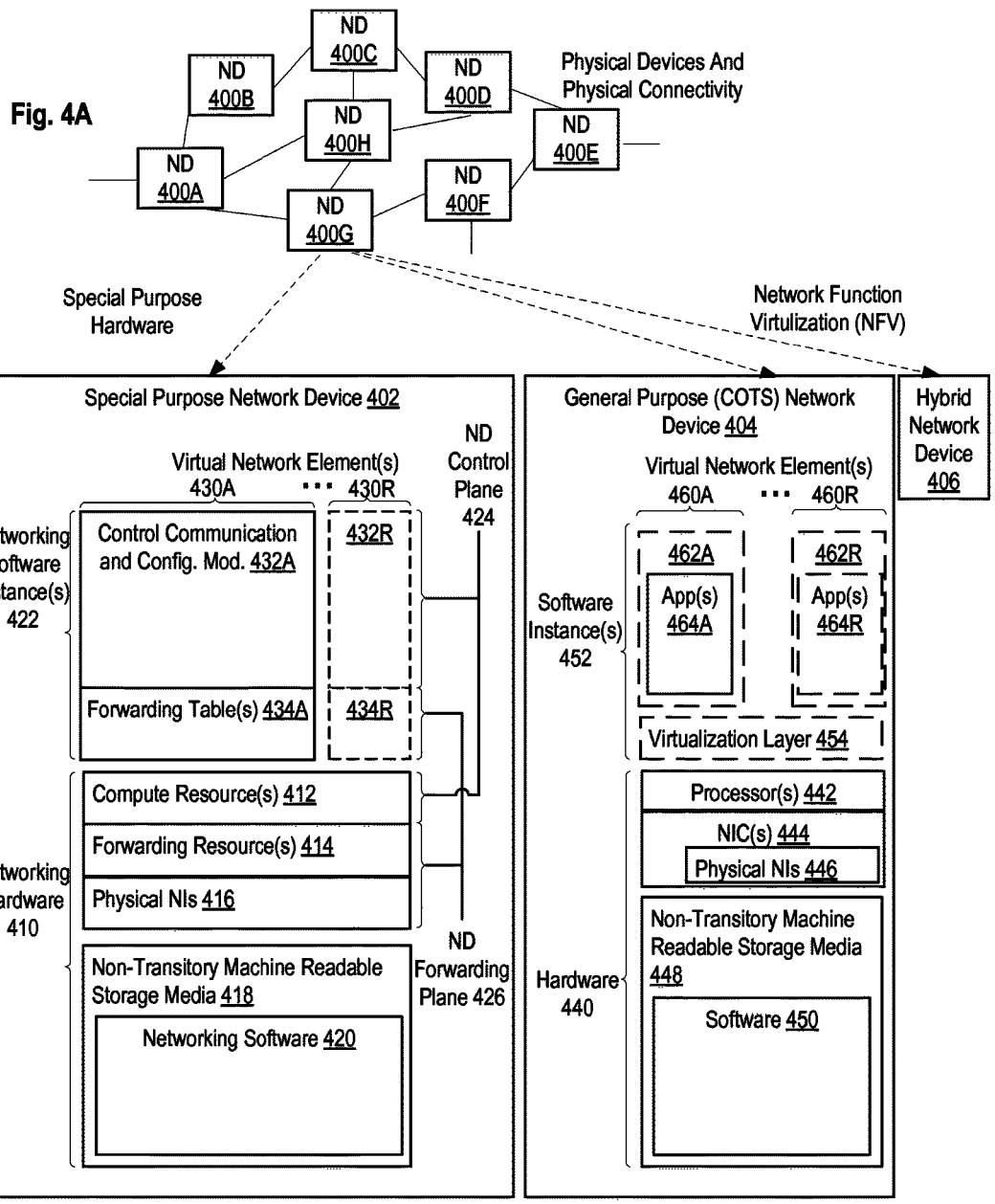

Fig. 4C
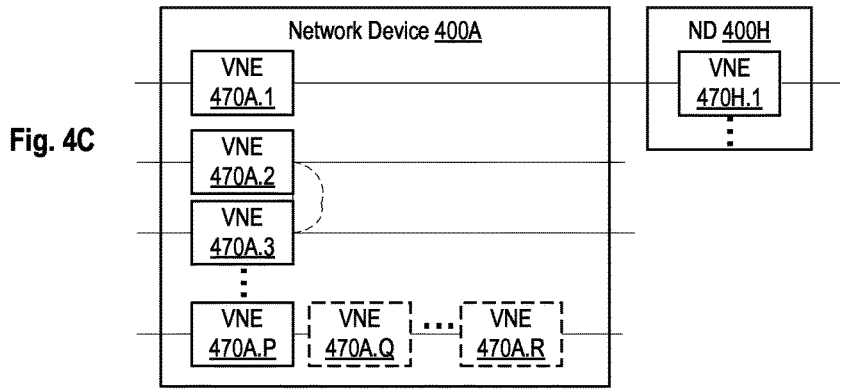
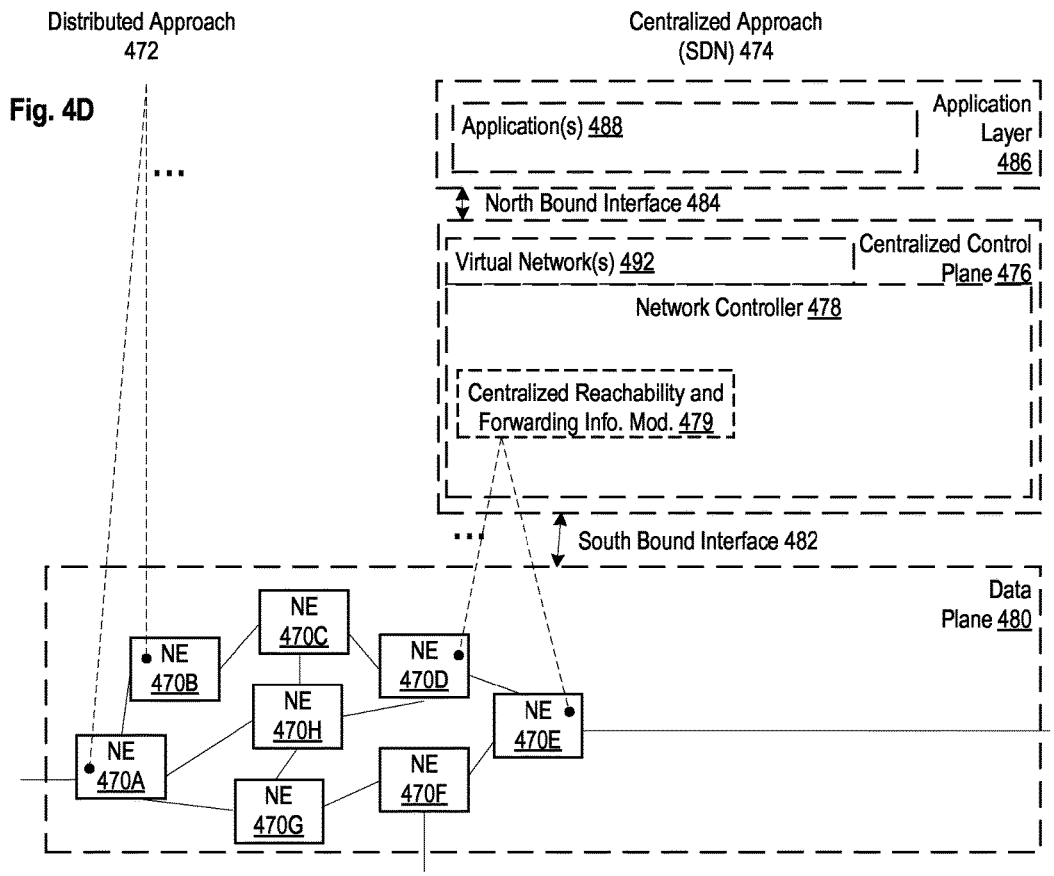
Fig. 4D
Fig. 4E
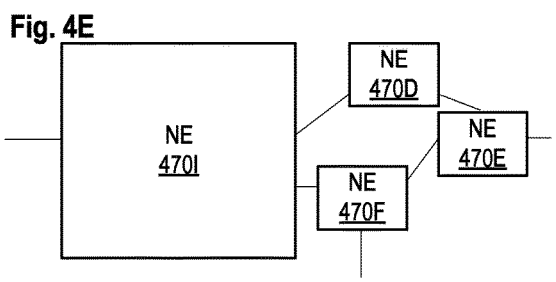
Fig. 4F
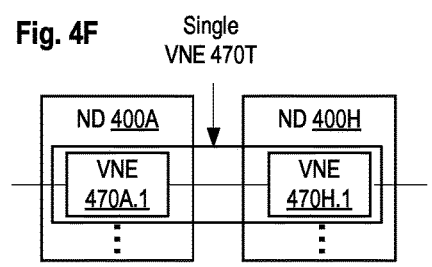

METHOD FOR OPTIMIZED PLACEMENT OF SERVICE-CHAIN-MONITORING PROBES

CROSS-REFERENCE TO RELATED APPLICATIONS

This application claims the benefit of U.S. Provisional Application No. 62/140,936, filed Mar. 31, 2015, which is hereby incorporated by reference.

FIELD

Embodiments of the invention relate to the field of packet networks, and more specifically, to the optimization of monitoring probe placement.

BACKGROUND

There are various reasons why network operators desire to measure traffic in their networks. Network measurement, for example, provides the data required for better network control, enabling the operator to characterize the state of the network, the traffic demands, and the actual consumption of network resources. Network measurement also enables trouble shooting or even prevents service-level agreement (SLA) violations before they occur.

With recent technological advancements such as Software-Defined Networking (SDN) and Network Function Virtualization (NFV), operators have coined the term "service chaining" to mean the differentiated forwarding of traffic flows across a policy defined ordered set of middle boxes (also commonly referred to as services, inline services, appliances, network functions/vNFs in case of NFV, or Service Functions (SF)). Examples SFs include firewalls, content filters, Intrusion Detection Systems (IDS), Deep Packet Inspection (DPI), Network Address Translation (NAT), content caches, load-balancers, Wide Area Network (WAN) accelerators, multimedia transcoders, logging/metering/charging/advanced charging applications, etc Service chaining requires a classification process to forward packets on the correct service chain, followed by the differentiated forwarding/routing of the traffic flow across the right set of SFs or service function chain (SFC). Given the importance of this networking use case, the Internet Engineering Task Force (IETF) is developing protocols that will allow more efficient ways to implement SFCs. The IETF is also working on the definition of a Network Service Header (NSH) that will be applied to packets by the classifier. Then Service Function Forwarders (SFFs) will create the Service Function Paths (SFP) in the form of an overlay. IETF's solution is applicable to both physical Network Functions (NF) and virtual NFs (vNF) as defined by ETSI Network Functions Virtualization (NFV), referred to as SF in IETF.

In a typical service chaining system, probes (e.g., counters) can be instantiated (i.e., allocated) at various points in a SFP to perform network measurements. Existing network monitoring tools are not flexible and cannot perform consolidation of probes based on monitoring requests and rule consolidation. Moreover, none of the conventional network monitoring tools are specifically implemented around service function chaining, where existing forwarding plane rules and attached counters can be leveraged.

SUMMARY

Exemplary methods performed by a first network device for optimizing placement of probes, include receiving a plurality of requests comprising of monitoring zones (MZs), wherein each MZ is to be allocated a pair of probes in a network, wherein each MZ is associated with a rule identifying a condition for when its probes are to be updated, and wherein each probe in the network is associated with a rule identifying a condition of when the corresponding probe is updated. The methods further include determining whether one or more previously allocated pairs of probes in the network can serve as probes for one or more MZs in the plurality of requests, wherein a previously allocated pair of probes in the network can serve as probes for a MZ if a rule associated with the MZ is similar to rules associated with the previously allocated pair of probes. The methods further include for each MZ that can be served by a previously allocated pair of probes, sending information identifying the MZ and the previously allocated pair of probes that can serve it.

According to one embodiment, the methods include identifying, among MZs that cannot be served by previously allocated pairs of probes, a first set of MZs comprising of a first MZ and a second MZ that can be consolidated with each other, wherein MZs can be consolidated if a rule associated with an MZ is similar to a rule associated with another MZ. The methods further include identifying, for the first MZ in the first set of MZs, a first list of one or more unallocated pairs of probes in the network that can serve as probes of the first MZ, and identifying, for the second MZ in the first set of MZs, a second list of one or more unallocated pairs of probes in the network that can serve as probes of the second MZ, wherein at least one unallocated pair of probes in the second list of one or more unallocated pairs of probes is associated with a rule that is same as a rule associated with an unallocated pair of probes in the first list of one or more unallocated pairs of probes.

According to one embodiment, the methods include identifying a first group of one or more combinations of the first and second MZs included in the first set of MZs, wherein each combination includes an unallocated pair of probes from the first list of one or more unallocated pairs of probes and an unallocated pair of probes from the second list of one or more unallocated pairs of probes.

According to one embodiment, the methods include determining a cost for each combination in the first group of one or more combinations by adding costs associated with each probe in the combination, wherein a cost of only one probe is added when a plurality of probes can be consolidated, wherein probes can be consolidated if they are associated with same rules, and identifying, from the first group of one or more combinations of MZs, a first combination that has a lowest cost.

According to one embodiment, the methods include in response to determining the first combination of MZs with the lowest cost includes consolidated probes, sending information identifying the first MZ, the second MZ, and the consolidated probes that can serve as probes of the first and second MZ.

According to one embodiment, the methods include identifying, among MZs that cannot be served by previously allocated pairs of probes, a second set of MZs comprising of a third MZ and a fourth MZ that cannot be consolidated with each other, wherein MZs cannot be consolidated if a rule associated with an MZ is not similar to a rule associated with another MZ. The methods further include identifying, for the third MZ in the second set of MZs, a third list of one or more unallocated pairs of probes in the network that can serve as probes of the third MZ, and identifying, for the fourth MZ in the second set of MZs, a fourth list of one or more unallocated pairs of probes in the network that can serve as probes of the fourth MZ.

According to one embodiment, the methods include identifying a second group of one or more combinations of the third and fourth MZs included in the second set of MZs, wherein each combination includes an unallocated pair of probes from the third list of one or more unallocated pairs of probes and an unallocated pair of probes from the fourth list of one or more unallocated pairs of probes.

According to one embodiment, the methods further include determining a cost for each combination in the second group of one or more combinations by adding costs associated with each probe in the combination, and identifying, from the second group of one or more combinations of MZs, a second combination that has a lowest cost.

According to one embodiment, in response to determining the second combination of MZs has the lowest cost, sending information identifying the third MZ, the fourth MZ, and the unallocated probes in the second combination that can serve as probes of the third and fourth MZ.

According to one embodiment, for each request in the plurality of requests, in response to determining at least one MZ in the request cannot be allocated a pair of unallocated probes in the network, sending information identifying the request and the at least one MZ.

BRIEF DESCRIPTION OF THE DRAWINGS

The invention may best be understood by referring to the following description and accompanying drawings that are used to illustrate embodiments of the invention. In the drawings:

FIG. 3-A is block diagram illustrating a service chaining system according to one embodiment.

FIG. 3-B is block diagram illustrating a service chaining system according to one embodiment.

FIG. 3-C is block diagram illustrating a service chaining system according to one embodiment.

FIG. 3-D is block diagram illustrating a service chaining system according to one embodiment.

FIG. 3-E is block diagram illustrating a service chaining system according to one embodiment.

FIG. 3-F is block diagram illustrating a service chaining system according to one embodiment.

FIG. 3-G is block diagram illustrating a service chaining system according to one embodiment.

FIG. 3-H is block diagram illustrating a service chaining system according to one embodiment.

FIG. 3-I is block diagram illustrating a service chaining system according to one embodiment.

FIG. 3-J is block diagram illustrating a service chaining system according to one embodiment.

FIG. 4A illustrates connectivity between network devices (NDs) within an exemplary network, as well as three exemplary implementations of the NDs, according to some embodiments of the invention.

FIG. 4B illustrates an exemplary way to implement a special-purpose network device according to some embodiments of the invention.

FIG. 4C illustrates various exemplary ways in which virtual network elements (VNEs) may be coupled according to some embodiments of the invention.

FIG. 4D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 4E illustrates the simple case of where each of the NDs implements a single NE, but a centralized control plane has abstracted multiple of the NEs in different NDs into (to represent) a single NE in one of the virtual network(s), according to some embodiments of the invention.

FIG. 4F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DESCRIPTION OF EMBODIMENTS

Figure 1:
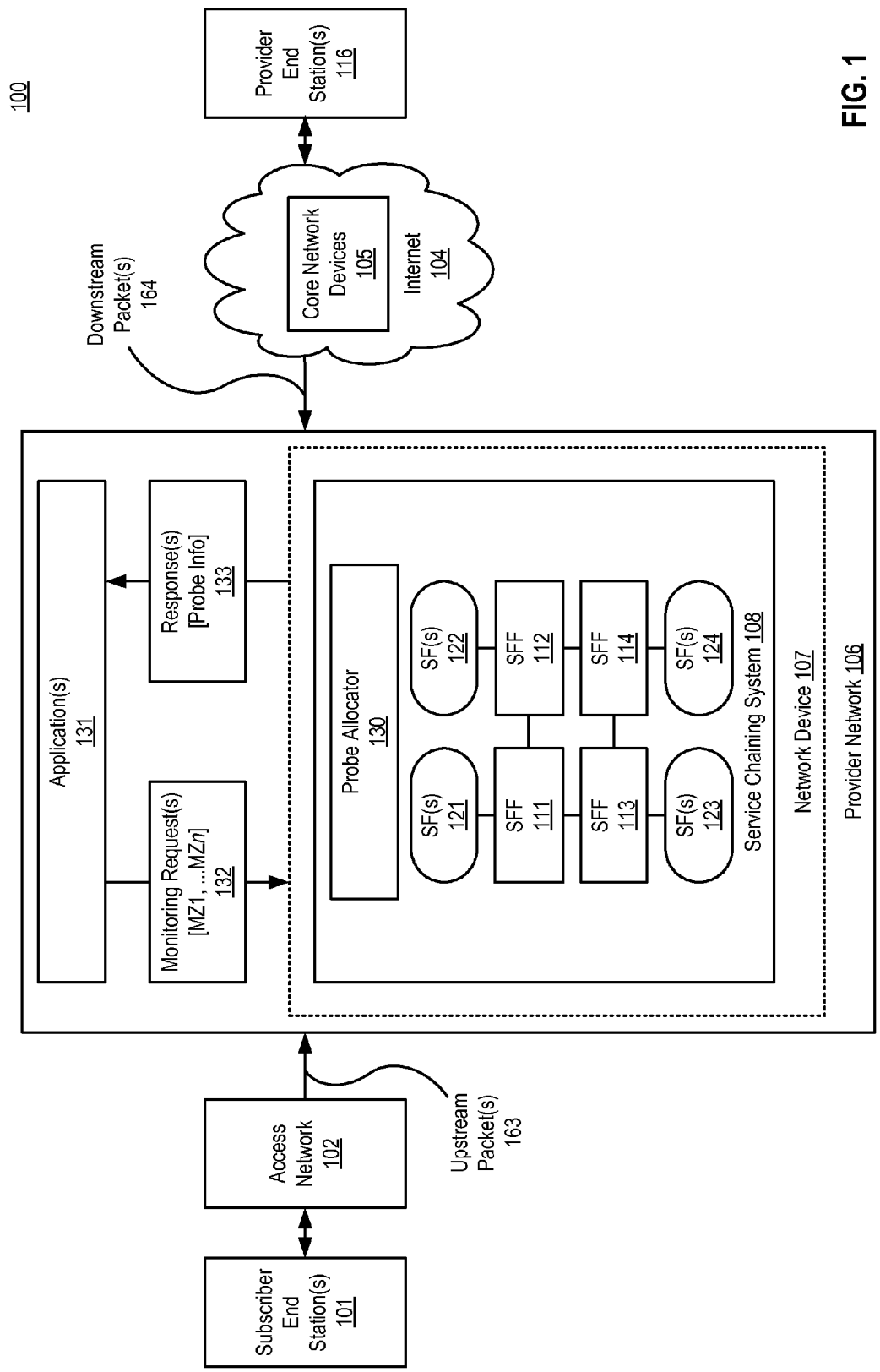
FIG. 1 is a block diagram illustrating a network according to one embodiment.

The following description describes methods and apparatus for optimizing placement of monitoring probes. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a block diagram illustrating a network according to one embodiment. In the illustrated example, network 100 includes, but is not limited to, one or more subscriber end stations 101. Examples of suitable subscriber end stations include, but are not limited to, servers, workstations, laptops, netbooks, palm tops, mobile phones, smartphones, multimedia phones, tablets, phablets, Voice Over Internet Protocol (VOIP) phones, user equipment, terminals, portable media players, GPS units, gaming systems, set-top boxes, and combinations thereof. Subscriber end stations 101 access content/services provided over the Internet and/or content/services provided on virtual private networks (VPNs) overlaid on (e.g., tunneled through) the Internet. The content and/or services are typically provided by one or more provider end stations 116 (e.g., server end stations) belonging to a service or content provider. Examples of such content and/or services include, but are not limited to, public webpages (e.g., free content, store fronts, search services), private webpages (e.g., username/password accessed webpages providing email services), and/or corporate networks over VPNs, etc.

As illustrated, subscriber end stations 101 are communicatively coupled (e.g., through customer premise equipment) to access networks 102 (wired and/or wirelessly). Access networks 102 can be communicatively coupled to provider edge network devices (e.g., network device 107) of provider edge network 106. The provider edge network devices may be communicatively coupled through Internet 104 (e.g., through one or more core network devices 105) to one or more provider end stations 116 (e.g., server end stations). In some cases, the provider edge network devices of provider edge network 106 may host on the order of thousands to millions of wire line type and/or wireless subscriber end stations, although the scope of the invention is not limited to any known number.

Subscriber end stations 101 may transmit upstream packets 163 toward provider end stations 116. Provider end stations 116 may transmit downstream packets 164 toward subscriber end stations 101. Upstream packets 163 and/or downstream packets 164 may traverse provider edge network 106 and/or network device 107.

According to one embodiment, network 100 includes service chaining system (SC system) 108 for performing services on packets traversing provider network 106. In the illustrated example, SC system 108 includes service function forwarders (SFFs) 111-114. As used herein, a "SFF" refers to any module that is adapted or configured to forward packets to other SFF along a service function path (SFP). A SFF, for example, can forward packets along the SFP based on information contained in a forwarding information base (FIB) or an Open Flow table. According to one embodiment, each SFF is associated with one or more SFs. In the illustrated example, SFFs 111-114 are associated with SFs 121-124, respectively.

SFs 121-124 are adapted or configured to perform services on upstream packets 163 and/or downstream packets 164. Each SF can be implemented in software, firmware, hardware, or any combination thereof. In one embodiment, the SFs may provide advanced subscription based services or operations. Examples of suitable services include, but are not limited to, Deep Packet Inspection (DPI) services, Transparent Internet Caching (TIC) services, Content Delivery Network (CDN) services, Network Address Translation (NAT) services. Other examples of suitable services include, but are not limited to, parental control services, Internet Protocol Security (IPSec) services, firewall services, WAN (wireless area network) optimization services, and profiling and flow tracking services. According to one embodiment, application of these services to subscriber traffic may be determined at least in part based on subscription policies (e.g., payment plans) associated with the subscribers or subscriber end stations. For example, one subscriber may desire the service of SF 121, whereas another subscriber may desire to pay for the service of 122. In some aspects, these subscription policies may be included in the subscriber records or attributes associated with the subscribers or subscriber end stations. According to one embodiment, the application of these services to subscriber traffic can be determined by the operator. For example, the operator configures the SFs that are to be applied on various subscriber traffic.

According to one embodiment, at each ingress and egress point of each SFF and/or SF, monitoring resources such as probes are available for performing network measurements. A probe can be, for example, a counter in an Open vSwitch (OVS). Each probe is associated with a cost, which, in one embodiment, is a positive value. According to one embodiment, the cost of a probe is preconfigured by an operator. In one embodiment, the cost of each probe is fixed, depending on the probe type. In another embodiment, the cost of each probe is inversely proportional to the percentage of availability of the respective probe type. Thus, for example, a particular probe type may have a lower cost in a first round of allocation, but may have a higher cost on a second round of allocation because it has been allocated in the first round, thereby reducing its percentage of availability. Further, each probe is associated with a rule, which can either be its own dedicated rule or a rule of the SFP to which the probe belongs. A rule defines a condition for when the corresponding probe is to be updated (e.g., incremented, decremented, etc.). According to one embodiment, each rule (whether it be a dedicated rule or an SFP rule) can be up to 5 tuple minimum (e.g., source Internet Protocol (IP) address, destination IP address, source port, destination port, and protocol identifier (ID)) or also cover Layer 4-7 information from the packets.

Provider network 106 includes one or more applications 131 (e.g., monitoring SDN applications) that are communicatively coupled to SC system 108. Applications 131 may send monitoring requests 132 (herein referred to simply as "requests") to probe allocator 130. Each of requests 132 includes one or more monitoring zones (MZs). A MZ is associated with a rule, and comprises of an ingress probe and an egress probe for performing network measurement based on the associated rule. The ingress and egress probe of the MZ can be allocated (i.e., placed) anywhere along a SFP, as long as it satisfies the rule to which the MZ is associated.

According to one embodiment, in response to receiving requests 132 from applications 131, probe allocator 130 is configured to identify possible probes in network 100 that can be allocated to serve as ingress and egress counters of the requested MZs. In response to receiving requests from applications 131, probe allocator 130 is to determine the most optimal solution. As used herein, the "most optimal" solution refers to a solution that incurs the lowest cost.

According to one embodiment, probe allocator 130 is to send response 133 back to applications 131. Responses 133 may include information identifying the requests, the MZs of the requests, and probes that have been allocated to serve the requested MZs. The information identifying the allocated probes includes, but is not limited to, the network device and the physical port that the probe is located at, the rules that the MZ and the allocated probes are associated with. It should be noted that other information can be included as part of responses 133 without departing from the broader scope and spirit of the present invention.

According to one embodiment, the various modules of SC system 108 can be implemented as part of one network device. For example, probe allocator 130, SFFs 111-114, and SFs 121-124 may be implemented as part of network device 107. In an alternative embodiment, the various modules of SC system 108 can be implemented as virtual machines that are executed on one or more network devices. In such an embodiment, the various virtualized modules of SC system 108 that are distributed among different network devices communicate with other using tunneling mechanisms (e.g., Virtual Extensible LAN (VxLAN)). Virtual machines are described in further details below. Embodiments of the present invention shall now be described in greater details through the description of various other figures below.

Throughout the description, probe placement/allocation is described in the context of service chaining. It should be understood that the present invention is not so limited, and applies equally to any system wherein packet flows are routed through a given path that is known or can be determined by the probe allocator, and wherein probes can be placed along that path.

Figure 2:
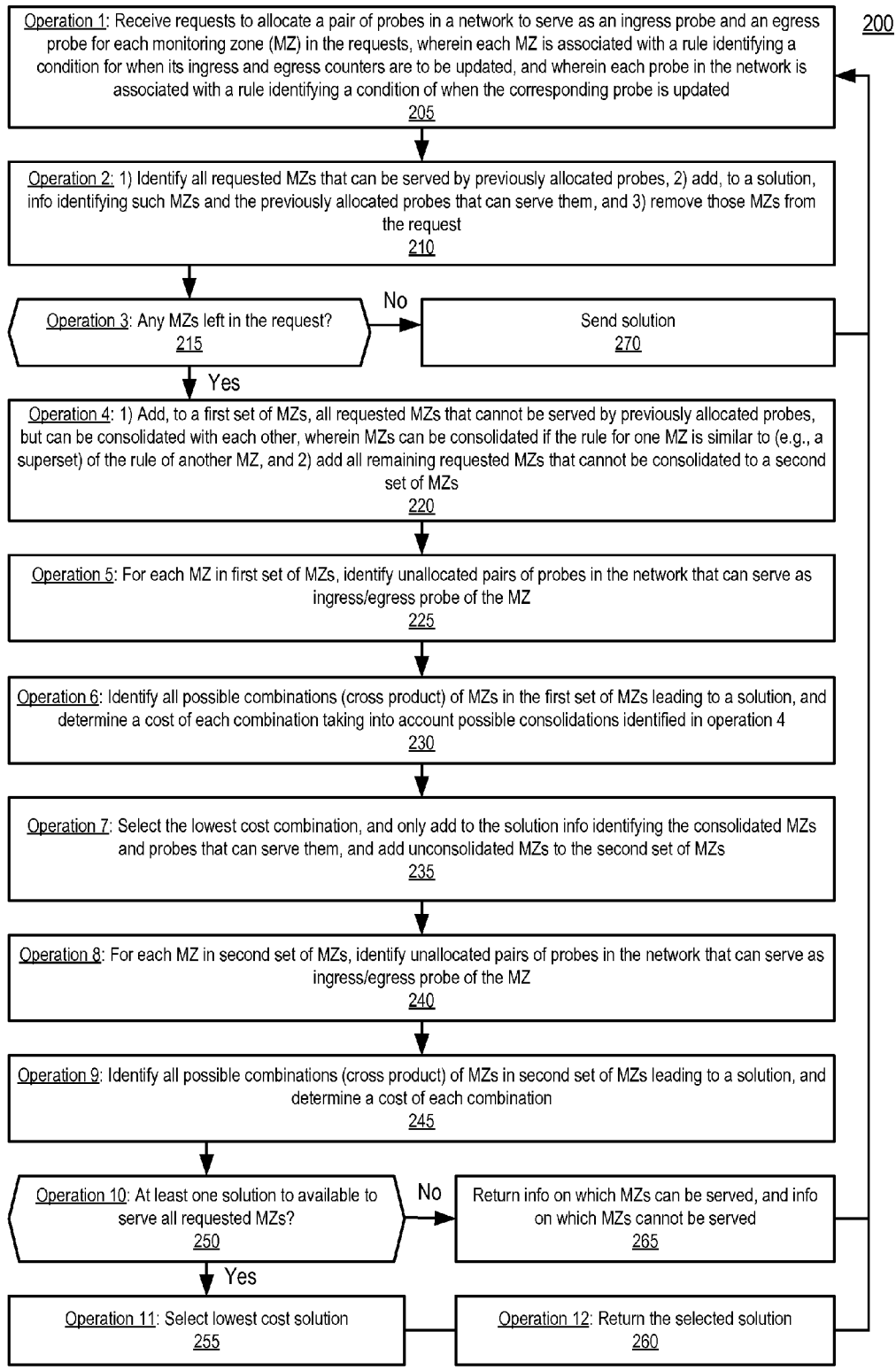
FIG. 2 is a flow diagram illustrating a method for optimizing monitor probe placement according to one embodiment.

FIG. 2 is a flow diagram illustrating a method for optimizing monitor probe placement according to one embodiment. For example, method 200 can be implemented by probe allocator 130, which can be implemented in software, firmware, hardware, or any combination thereof. The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams. FIG. 2 shall be described with reference to the exemplary embodiment illustrated in FIGS. 3-A through 3-J.

FIGS. 3-A through 3-J are block diagrams illustrating a service chaining system according to one embodiment. In the illustrated example, SC system 108 includes SFFs 111-114 communicatively coupled with each other. SFF 112 is associated with SFs 301-302, and SFF 113 is associated with SF 303. In this example, three SFPs have been created. SFP 311 is created to carry traffic that matches the rule srcIP@ 129.192.172.0/8. In other words, SFP 311 carries all traffic that originates from a source having an IP address of 129.192.172.0/8 (e.g., traffic belonging to Ericsson New Jersey (NJ)). SFP 311 comprises the following segments between: 1) SFF 111 and SFF 112, 2) SFF 112 and SF 301, 3) SF 301 and SFF 112, 4) SFF 112 and SF 302, 5) SF 302 and SFF 112, 6) SFF 112 and SFF 114.

SFP 312 is created to carry traffic that matches the rule srcIP@ 129.192.170.0/8. In other words, SFP 312 carries all traffic that originates from a source having an IP address of 129.192.170.0/8 (e.g., traffic belonging to Ericsson San Jose (SJ)). SFP 312 comprises the following segments between: 1) SFF 111 and SFF 112, 2) SFF 112 and SF 302, 3) SF 302 and SFF 112, 4) SFF 112 and SFF 114. SFP 313 is created to carry traffic that matches the rule srcIP@ 129.192.171.0/8. In other words, SFP 313 carries all traffic that originates from a source having an IP address of 129.192.171.0/8 (e.g., traffic belonging to Ericsson DAL). SFP 313 comprises the following segments between: 1) SFF 111 and SFF 113, 2) SFF 113 and SF 303, 3) SF 303 and SFF 113, 4) SFF 113 and SFF 114. In this example, MZ90 comprising of probes 90_1 and 90_2 have also been previously allocated to monitor traffic entering and exiting, respectively, SF 303 on SFP 313.

Referring now to FIG. 2, at block 205, as part of operation 1, a probe allocator receives requests to allocate a pair of probes in a network to serve as an ingress probe and an egress probe for each monitoring zone (MZ) in the requests, wherein each MZ is associated with a rule identifying a condition for when its ingress and egress counters are to be updated, and wherein each probe in the network is associated with a rule identifying a condition for when the corresponding probe is updated. For example, as illustrated in FIG. 3-B, probe allocator 130 receives the following requests:

R1: MZ11=anywhere on SFP 311, monitor traffic destIP@74.125.0.0/16 (Google),

R2: MZ21=anywhere on SFP 312, monitor traffic destIP@74.125.0.0/16 (Google),

R3: MZ31=anywhere on SFP 313, monitor traffic destIP@74.125.0.0/16 (Google),

R4: MZ41=on SFP 311, monitor SF 302,

R5: MZ51=on SFP 312, monitor SF 302,

R6: MZ61=on SFP 313, monitor SF 303, and

R7: MZ71=on SFP 313, monitor SF 303 for traffic destIP@74.125.0.0/16 (Google).

Thus, request R1 requests probe allocator 130 to allocate probes to serve as ingress and egress probes of MZ11, which is associated with a rule that requires monitoring of traffic with a destination IP address of 74.125.0.0/16 (e.g., traffic destined for Google) at any point on SFP 311. Request R2 requests probe allocator 130 to allocate probes to serve as ingress and egress probes of MZ21, which is associated with a rule that requires monitoring of traffic with a destination IP address of 74.125.0.0/16 (e.g., traffic destined for Google) at any point on SFP 312. Request R3 requests probe allocator 130 to allocate probes to serve as ingress and egress probes of MZ31, which is associated with a rule that requires monitoring of traffic with a destination IP address of 74.125.0.0/16 (e.g., traffic destined for Google) at any point on SFP 313.

Request R4 requests probe allocator 130 to allocate probes to serve as ingress and egress probes of MZ41, which is associated with a rule that requires monitoring of all traffic on SFP 311 at SF 302. Request R5 requests probe allocator 130 to allocate probes to serve as ingress and egress probes of MZ51, which is associated with a rule that requires monitoring of all traffic on SFP 312 at SF 302. Request R6 requests probe allocator 130 to allocate probes to serve as ingress and egress probes of MZ61, which is associated with a rule that requires monitoring of all traffic on SFP 313 at SF 303. Request R7 requests probe allocator 130 to allocate probes to serve as ingress and egress probes of MZ71, which is associated with a rule that requires monitoring of traffic with a destination IP address of 74.125.0.0/16 (e.g., traffic destined for Google) at SF 303 on SFP 313.

Referring now back to FIG. 2, at block 210, as part of operation 2, the probe allocator identifies all requested MZs that can be served by previously allocated probes. The probe allocator then adds, to a solution, information identifying such MZs and the previously allocated probes that can serve them, and remove those MZs from the request. In one embodiment, a previously allocated pair of probes in the network can serve as an ingress and egress probe for a requested MZ if a rule associated with the requested MZ is similar to the rules associated with the previously allocated pair of probes. As used herein, rules are "similar" if their similarities allow them to be consolidated. For example, rules are similar if they are superset, subset, or identical with each other. For example, as illustrated in FIG. 3-C, probe allocator 130 determines that existing (i.e., previously allocated) probes 90_1 and 90_2 are associated with rules that require the probes to monitor all traffic on SFP 313 at SF 303. Probe allocator 130 determines that the rule associated with requested MZ61 is the same as the rules associated with previously allocated probes 90_1 and 90_2. Accordingly, probe allocator 130 adds info 320 to solution 319. Info 320 includes, for MZ61: 1) information identifying request R6 as the request to which MZ61 belongs, 2) information indicating that probes 90_1 and 90_2 are allocated to MZ61, and 3) information identifying probes 90_1 and 90_2 (e.g., the network device and physical port at which probes 90_1 and 90_2 are located, the rules associated with probes 90_1 and 90_2, etc.). It should be understood that the information identifying the probes can be directly included as part of info 320. Alternatively, info 320 can include a reference to a memory location containing such information.

Referring now back to FIG. 2, at block 215, as part of operation 3, the probe allocator determines whether there are any MZs left in the request to be serviced. At block 220, as part of operation 4, the probe allocator adds, to a first set of MZs, all requested MZs that cannot be served by previously allocated probes, but can be consolidated with each other, wherein MZs can be consolidated if the rule for one MZ is similar to the rule of another MZ. As part of operation 3, the probe allocator adds all remaining requested MZs that cannot be consolidated to a second set of MZs. For example, as illustrated in FIG. 3-D, probe allocator 130 determines that requested MZ31 is associated with a rule that is similar to the rule associated with requested MZ71. Accordingly, probe allocator 130 identifies first set of MZs 321 comprising of MZ31 and MZ71. Probe allocator 130 identifies second set of MZs 322 comprising of MZ11, MZ21, MZ41, and MZ51 because these probes cannot be consolidated with each other.

Referring now back to FIG. 2, at block 225, as part of operation 5, for each MZ in the first set of MZs, the probe allocator identifies unallocated pairs of probes in the network that can serve as ingress and egress probes of the MZ. According to one embodiment, a probe in the network can serve as an ingress or egress probe of a MZ if it is on the traffic path associated with the MZ, can be updated based on a rule associated with the MZ, and has enough capacity (e.g., memory to install the rules). For example, as illustrated in FIG. 3-E, probe allocator 130 identifies list 323 comprising of the following unallocated pairs of probes that can serve as the ingress and egress probe for requested MZ31: {31_1, 31_2}, {31_1, 31_3}, {31_1, 31_4}, {31_1, 31_5}, {31_1, 31_6}, {31_2, 31_3}, {31_2, 31_4}, {31_2, 31_5}, {31_2, 31_6}, {31_3, 31_4}, {31_3, 31_5}, {31_3, 31_6}, {31_4, 31_5}, {31_4, 31_6}, {31_5, 31_6}. In this example, probe allocator 130 also identifies list 324 comprising of the following unallocated pairs of probes that can serve as the ingress and egress probe for requested MZ71: {71_1, 71_2}. It should be noted that in some embodiments, due to resource constraints, probe allocator 130 may not identify all possible combinations of probes that can serve the requested MZs. For example, probe allocator 130 may be configured to stop identifying the combinations after a predetermined threshold (e.g., maximum processing time, maximum combination count, etc.) has been reached. In some embodiments, policies may be applied to avoid probes at certain locations in the network, thus, the solution space can be reduced to a manageable size.

Returning again back to FIG. 2, at block 230, as part of operation 6, the probe allocator identifies all possible combinations (i.e., the cross product) of all MZs in the first set of MZs leading to a solution, and determines a cost of each combination taking into account possible consolidations identified in operation 4. For example, as illustrated in FIG. 3-F, probe allocator 130 determines the cross product of [MZ31, MZ71] by identifying group 325 comprising of all combinations of pairs of probes from list 323 and pairs of probes from list 324. By way of example, to create group 325 comprising of the cross product of [MZ31, MZ71], probe allocator 130 takes the first pair of probes (i.e., {31_1, 31_2}) from list 323 and pairs it with each pair of probes in list 324; probe allocator 130 then takes the second pair of probes (i.e., {31_1, 31_3}) from list 323 and pairs it with each pair of probes in list 324, and so on, until all pairs of probes in list 323 have been processed. In this example, group 325 includes the following combinations of pairs of probes: [{31_1, 31_2} {71_1, 71_2}], [{31_1, 31_3} {71_1, 71_2}], . . . , [{31_5, 31_6} {71_1, 71_2}]. In one embodiment, probe allocator 130 determines the cost of each combination by adding the cost associated with each probe in the combination, taking into account the fact that the probes may be consolidated, in which case only the cost of one probe is added. By way of example, probe allocator 130 determines the cost of the first combination in group 325 (i.e., [{31_1, 31_2} {71_1, 71_2}]) by adding the costs associated with probes 31_1, 31_2, 71_1, and 71_2. By way of further illustration, probe allocator 130 determines the cost for the combination [{31_3, 31_4} {71_1, 71_2}] by adding the cost associated with probe 31_3 or 71_1, but not both, because these two probes can be consolidated (as illustrated in FIG. 3-F), and by adding the cost associated with probe 31_4 or 71_2, but not both, because these two probes can be consolidated (as illustrated in FIG. 3-F).

Returning again back to FIG. 2, at block 235, as part of operation 7, the probe allocator selects the lowest cost combination, and if the lowest cost combination includes consolidated probes, the probe allocator adds it to the solution. As part of operation 7, the probe allocator adds unconsolidated MZs to the second set of MZs. In other words, as part of operation 7, the probe allocator only provides the lowest cost combination as a solution to the request if the lowest cost combination includes probes that are consolidated. Otherwise, the probe allocator does not provide the lowest combination as a solution to the request, but instead, the probe allocator adds the MZs to the second set of MZs for further processing. It should be noted that the lowest cost combination is typically the solution that includes consolidated probes (because only the cost of one probe is added to the total cost, as opposed to adding all costs of all the consolidated probes).

By way of example, as illustrated in FIG. 3-G, probe allocator 130 determines that the lowest cost combination is combination 326 comprising of probes {31_3, 31_4} and {71_1, 71_2}. Probe allocator 130 determines that probes 31_3 and 71_1 can be consolidated, and further determines that probes 31_4 and 71_2 can be consolidated. In response to determining that the probes of combination 326 can be consolidated, probe allocator 130 adds combination 326 to solution 319. More specifically, probe allocator 130 determines that probes 71_1 and 71_2 are associated with costs that are lower than the costs associated with probes 31_3 and 31_4, respectively. In response to such a determination, probe allocator 130 allocates probes 71_1 and 71_2 to consolidated MZ31 and MZ71. Accordingly, probe allocator 130 adds info 327 to solution 319. In this example, info 327 includes, for MZ31: 1) information identifying request R3 as the request to which MZ31 belongs, 2) information indicating that probes 71_1 and 71_2 are allocated to MZ31, and 3) information identifying probes 71_1 and 71_2 (e.g., the network device and physical port at which probes 71_1 and 71_2 are located, the rules associated with probes 71_1 and 71_2, etc.). Info 327, in this example, further includes for MZ71: 1) information identifying request R7 as the request to which MZ71 belongs, 2) information indicating that probes 71_1 and 71_2 are allocated to MZ71, and 3) information identifying probes 71_1 and 71_2 (e.g., the network device and physical port at which probes 71_1 and 71_2 are located, the rules associated with probes 71_1 and 71_2, etc.). It should be emphasized that if probes 31_3, 31_4, 71_1, and 71_2 cannot be consolidated, probe allocator 130 would not add the combination to solution 319. Instead, probe allocator 130 would add probes 31_3, 31_4, 71_1, and 71_2 to second set 322 of MZs (see FIG. 3-D) for further processing.

Referring now back to FIG. 2, at block 240, as part of operation 8, for each MZ in the second set of MZs, the probe allocator identifies unallocated pairs of probes in the network that can serve as an ingress and egress probe of the MZ. For example, as illustrated in FIG. 3-H, probe allocator 130 identifies list 328 comprising of the following unallocated pairs of probes that can serve as the ingress and egress probe for requested M11: {11_1, 11_2}, {11_1, 11_3}, {11_1, 11_4}, {11_1, 11_5}, {11_1, 11_6}, {11_2, 11_3}, {11_2, 11_4}, {11_2, 11_5}, {11_2, 11_6}, {11_3, 11_4}, {11_3, 11_5}, {11_3, 11_6}, {11_4, 11_5}, {11_4, 11_6}, {11_5, 11_6}. In this example, probe allocator 130 also identifies list 329 comprising of the following unallocated pairs of probes that can serve as the ingress and egress probe for requested MZ21: {21_1, 21_2}, {21_1, 21_3}, {21_1, 21_4}, {21_1, 21_5}, {21_1, 21_6}, {21_2, 21_3}, {21_2, 21_4}, {21_2, 21_5}, {21_2, 21_6}, {21_3, 21_4}, {21_3, 21_5}, {21_3, 21_6}, {21_4, 21_5}, {21_4, 21_6}, {21_5, 21_6}. Probe allocator 130 also identifies set 333 comprising of the following unallocated pairs of probes that can serve as the ingress and egress probe for requested MZ41: {41_1, 41_2}. Probe allocator 130 also identifies set 334 comprising of the following unallocated pairs of probes that can serve as the ingress and egress probe for requested MZ51: {51_1, 51_2}. It should be noted that in some embodiments, due to resource constraints, probe allocator 130 may not identify all possible combinations of probes that can serve the requested MZs.

Returning again back to FIG. 2, at block 245, as part of operation 9, the probe allocator identifies all possible combinations (i.e., the cross product) of all MZs in the second set of MZs leading to a solution, and determines a cost of each combination. For example, as illustrated in FIG. 3-I, probe allocator 130 determines the cross product of [MZ11, MZ21, MZ41, MZ51] and store the combinations as part of group 330, using mechanisms similar to those described above with respect to group 325. In one embodiment, probe allocator 130 determines the cost of each combination by adding the cost associated with each probe in the combination.

Referring now to FIG. 2, at block 250, as part of operation 10, the probe allocator determines whether there is at least one solution available to serve all requested MZs. It should be noted that in some cases, probes may not be available, and thus, probe allocator 130 may not be able to determine a solution that can serve all requested MZs. At block 255, as part of operation 11, the probe allocator selects the lowest cost solution. For example, as illustrated in FIG. 3-J, probe allocator 130 has determined that combination 331 provides the lowest cost solution. In this example, combination 331 includes the probe pairs {11_1, 11_2}, {21_1, 21_2}, {41_1, 41_2}, and {41_1, 41_2}. As a result, probe allocator 131 adds these probes to solution 319 as part of info 332.

Info 332, in this example, includes, for MZ11: 1) information identifying request R1 as the request to which MZ11 belongs, 2) information indicating that probes 11_1 and 11_2 are allocated to MZ11, and 3) information identifying probes 11_1 and 11_2 (e.g., the network device and physical port at which probes 11_1 and 11_2 are located, the rules associated with probes 11_1 and 11_2, etc.). Info 332 also includes, for MZ21: 1) information identifying request R2 as the request to which MZ21 belongs, 2) information indicating that probes 21_1 and 21_2 are allocated to MZ21, and 3) information identifying probes 21_1 and 21_2 (e.g., the network device and physical port at which probes 21_1 and 21_2 are located, the rules associated with probes 21_1 and 21_2, etc.). Info 332 also includes, for MZ41: 1) information identifying request R4 as the request to which MZ41 belongs, 2) information indicating that probes 41_1 and 41_2 are allocated to MZ41, and 3) information identifying probes 41_1 and 41_2 (e.g., the network device and physical port at which probes 41_1 and 41_2 are located, the rules associated with probes 41_1 and 41_2, etc.). Info 332 also includes, for MZ51: 1) information identifying request R5 as the request to which MZ51 belongs, 2) information indicating that probes 51_1 and 51_2 are allocated to MZ51, and 3) information identifying probes 51_1 and 51_2 (e.g., the network device and physical port at which probes 51_1 and 51_2 are located, the rules associated with probes 51_1 and 51_2, etc.).

In one embodiment, in response to determining the number of combinations has exceeded a predetermined threshold, probe allocator 130 is configured to partition the requests into smaller groups, and perform operations 8-9 on each of the smaller group.

Returning now to FIG. 2, at block 260, as part of operation 12, the probe allocator returns the selected solution (e.g., solution 319) to the requestor. At block 265 (the "No" branch of block 250), in response to determining there is not a single solution that can serve all requested MZs, the probe allocator returns information to the requestor identifying which MZs can and cannot be served. At block 270 (the "No" branch of block 215), in response to determining all requested MZs can be served by existing/previously allocated probes, the probe allocator sends the solution to the requestor.

According to one embodiment, probe allocator 130 is configured to perform various other types of consolidation, for example, rule consolidation and counter consolidation. For example, in the case of rule consolidation, if the request is to count traffic from Ericsson NJ and Ericsson SJ and includes an MZ for monitoring SF 302 on SFP 311 (rule=srcIP@ 129.192.172.0/8) and another MZ for monitoring SF 302 on SFP 312 (rule=srcIP@ 129.192.170.0/8), instead of having two sets of probes for monitoring SFP 311 and SFP 312, it may sufficient to merge the rules by wildcarding the last 16 bits, assuming the path of the traffic crosses. For example, probe allocator 130 may allocate a single pair of probes, each associated with the rule srcIP@ 129.192.0.0/16).

In the case of counter consolidation, assuming simple packet count requests, if counters exist that count traffic for SFP 311 and SFP 312, and the request asks for the sum, a new counter is not needed, because the requestor can access existing counters and add the results. In such a case, probe allocator 130 can simply return information identifying the existing counters, and information instructing the requestor to add the identified counters. Similarly, if a counter already exists that includes the sum of traffic on SFP 311 and SFP 312, and another counter exists that only counts traffic on SFP 311, and the requestor requests for a count of traffic on SFP 312, a new counter is not needed because a simple subtraction of the existing counters will suffice. In such a case, probe allocator 130 can simply return information identifying the existing counters, and information instructing the requestor to subtract the identified counters.

FIG. 4A illustrates connectivity between network devices (NDs) within an exemplary network, as well as three exemplary implementations of the NDs, according to some embodiments of the invention. FIG. 4A shows NDs 400A-H and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 400A, E, and F illustrates that these NDs act as ingress and egress points for the network (and thus, these NDs are sometimes referred to as edge NDs; while the other NDs may be called core NDs).

Two of the exemplary ND implementations in FIG. 4A are: 1) a special-purpose network device 402 that uses custom application-specific integrated-circuits (ASICs) and a proprietary operating system (OS); and 2) a general purpose network device 404 that uses common off-the-shelf (COTS) processors and a standard OS.

The special-purpose network device 402 includes networking hardware 410 comprising compute resource(s) 412 (which typically include a set of one or more processors), forwarding resource(s) 414 (which typically include one or more ASICs and/or network processors), and physical network interfaces (NIs) 416 (sometimes called physical ports), as well as non-transitory machine readable storage media 418 having stored therein networking software 420. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 400A-H. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A).

Software 420 can include code which when executed by networking hardware 410, causes networking hardware 410 to perform operations of one or more embodiments of the present invention as part networking software instances 422.

The special-purpose network device 402 is often physically and/or logically considered to include: 1) a ND control plane 424 (sometimes referred to as a control plane) comprising the compute resource(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the compute resource(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

FIG. 4B illustrates an exemplary way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 404 includes hardware 440 comprising a set of one or more processor(s) 442 (which are often COTS processors) and network interface controller(s) 444 (NICs; also known as network interface cards) (which include physical NIs 446), as well as non-transitory machine readable storage media 448 having stored therein software 450. During operation, the processor(s) 442 execute the software 450 to instantiate one or more sets of one or more applications 464A-R. While one embodiment does not implement virtualization, alternative embodiments may use different forms of virtualization—represented by a virtualization layer 454 and software containers 462A-R. For example, one such alternative embodiment implements operating system-level virtualization, in which case the virtualization layer 454 represents the kernel of an operating system (or a shim executing on a base operating system) that allows for the creation of multiple software containers 462A-R that may each be used to execute one of the sets of applications 464A-R. In this embodiment, the multiple software containers 462A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 454 represents a hypervisor (sometimes referred to as a virtual machine monitor (VMM)) or a hypervisor executing on top of a host operating system; and 2) the software containers 462A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 464A-R, as well as the virtualization layer 454 and software containers 462A-R if implemented, are collectively referred to as software instance(s) 452. Each set of applications 464A-R, corresponding software container 462A-R if implemented, and that part of the hardware 440 that executes them (be it hardware dedicated to that execution and/or time slices of hardware temporally shared by software containers 462A-R), forms a separate virtual network element(s) 460A-R.

The virtual network element(s) 460A-R perform similar functionality to the virtual network element(s) 430A-R—e.g., similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 462A-R differently. For example, while embodiments of the invention are illustrated with each software container 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 462A-R to VNEs also apply to embodiments where such a finer level of granularity is used.

In certain embodiments, the virtualization layer 454 includes a virtual switch that provides similar forwarding services as a physical Ethernet switch. Specifically, this virtual switch forwards traffic between software containers 462A-R and the NIC(s) 444, as well as optionally between the software containers 462A-R; in addition, this virtual switch may enforce network isolation between the VNEs 460A-R that by policy are not permitted to communicate with each other (e.g., by honoring virtual local area networks (VLANs)).

Software 450 can include code which when executed by processor(s) 442, cause processor(s) 442 to perform operations of one or more embodiments of the present invention as part software containers 462A-R.

The third exemplary ND implementation in FIG. 4A is a hybrid network device 406, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

FIG. 4C illustrates various exemplary ways in which VNEs may be coupled according to some embodiments of the invention. FIG. 4C shows VNEs 470A.1-470A.P (and optionally VNEs 470A.Q-470A.R) implemented in ND 400A and VNE 470H.1 in ND 400H. In FIG. 4C, VNEs 470A.1-P are separate from each other in the sense that they can receive packets from outside ND 400A and forward packets outside of ND 400A; VNE 470A.1 is coupled with VNE 470H.1, and thus they communicate packets between their respective NDs; VNE 470A.2-470A.3 may optionally forward packets between themselves without forwarding them outside of the ND 400A; and VNE 470A.P may optionally be the first in a chain of VNEs that includes VNE 470A.Q followed by VNE 470A.R (this is sometimes referred to as dynamic service chaining, where each of the VNEs in the series of VNEs provides a different service—e.g., one or more layer 4-7 network services). While FIG. 4C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 4A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 4A may also host one or more such servers (e.g., in the case of the general purpose network device 404, one or more of the software containers 462A-R may operate as servers; the same would be true for the hybrid network device 406; in the case of the special-purpose network device 402, one or more such servers could also be run on a virtualization layer executed by the compute resource(s) 412); in which case the servers are said to be co-located with the VNEs of that ND.

A virtual network is a logical abstraction of a physical network (such as that in FIG. 4A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 4D illustrates a network with a single network element on each of the NDs of FIG. 4A, and within this straight forward approach contrasts a traditional distributed approach (commonly used by traditional routers) with a centralized approach for maintaining reachability and forwarding information (also called network control), according to some embodiments of the invention. Specifically, FIG. 4D illustrates network elements (NEs) 470A-H with the same connectivity as the NDs 400A-H of FIG. 4A.

FIG. 4D illustrates that the distributed approach 472 distributes responsibility for generating the reachability and forwarding information across the NEs 470A-H; in other words, the process of neighbor discovery and topology discovery is distributed.

For example, where the special-purpose network device 402 is used, the control communication and configuration module(s) 432A-R of the ND control plane 424 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 470A-H (e.g., the compute resource(s) 412 executing the control communication and configuration module(s) 432A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 424. The ND control plane 424 programs the ND forwarding plane 426 with information (e.g., adjacency and route information) based on the routing structure(s). For example, the ND control plane 424 programs the adjacency and route information into one or more forwarding table(s) 434A-R (e.g., Forwarding Information Base (FIB), Label Forwarding Information Base (LFIB), and one or more adjacency structures) on the ND forwarding plane 426. For layer 2 forwarding, the ND can store one or more bridging tables that are used to forward data based on the layer 2 information in that data. While the above example uses the special-purpose network device 402, the same distributed approach 472 can be implemented on the general purpose network device 404 and the hybrid network device 406.

FIG. 4D illustrates that a centralized approach 474 (also known as software defined networking (SDN)) that decouples the system that makes decisions about where traffic is sent from the underlying systems that forwards traffic to the selected destination. The illustrated centralized approach 474 has the responsibility for the generation of reachability and forwarding information in a centralized control plane 476 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 476 has a south bound interface 482 with a data plane 480 (sometime referred to the infrastructure layer, network forwarding plane, or forwarding plane (which should not be confused with a ND forwarding plane)) that includes the NEs 470A-H (sometimes referred to as switches, forwarding elements, data plane elements, or nodes). The centralized control plane 476 includes a network controller 478, which includes a centralized reachability and forwarding information module 479 that determines the reachability within the network and distributes the forwarding information to the NEs 470A-H of the data plane 480 over the south bound interface 482 (which may use the OpenFlow protocol). Thus, the network intelligence is centralized in the centralized control plane 476 executing on electronic devices that are typically separate from the NDs.

For example, where the special-purpose network device 402 is used in the data plane 480, each of the control communication and configuration module(s) 432A-R of the ND control plane 424 typically include a control agent that provides the VNE side of the south bound interface 482. In this case, the ND control plane 424 (the compute resource(s) 412 executing the control communication and configuration module(s) 432A-R) performs its responsibility for participating in controlling how data (e.g., packets) is to be routed (e.g., the next hop for the data and the outgoing physical NI for that data) through the control agent communicating with the centralized control plane 476 to receive the forwarding information (and in some cases, the reachability information) from the centralized reachability and forwarding information module 479 (it should be understood that in some embodiments of the invention, the control communication and configuration module(s) 432A-R, in addition to communicating with the centralized control plane 476, may also play some role in determining reachability and/or calculating forwarding information—albeit less so than in the case of a distributed approach; such embodiments are generally considered to fall under the centralized approach 474, but may also be considered a hybrid approach).

While the above example uses the special-purpose network device 402, the same centralized approach 474 can be implemented with the general purpose network device 404 (e.g., each of the VNE 460A-R performs its responsibility for controlling how data (e.g., packets) is to be routed (e.g., the next hop for the data and the outgoing physical NI for that data) by communicating with the centralized control plane 476 to receive the forwarding information (and in some cases, the reachability information) from the centralized reachability and forwarding information module 479; it should be understood that in some embodiments of the invention, the VNEs 460A-R, in addition to communicating with the centralized control plane 476, may also play some role in determining reachability and/or calculating forwarding information—albeit less so than in the case of a distributed approach) and the hybrid network device 406. In fact, the use of SDN techniques can enhance the NFV techniques typically used in the general purpose network device 404 or hybrid network device 406 implementations as NFV is able to support SDN by providing an infrastructure upon which the SDN software can be run, and NFV and SDN both aim to make use of commodity server hardware and physical switches.

FIG. 4D also shows that the centralized control plane 476 has a north bound interface 484 to an application layer 486, in which resides application(s) 488. The centralized control plane 476 has the ability to form virtual networks 492 (sometimes referred to as a logical forwarding plane, network services, or overlay networks (with the NEs 470A-H of the data plane 480 being the underlay network)) for the application(s) 488. Thus, the centralized control plane 476 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 4D shows the distributed approach 472 separate from the centralized approach 474, the effort of network control may be distributed differently or the two combined in certain embodiments of the invention. For example: 1)

embodiments may generally use the centralized approach (SDN) 474, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 474, but may also be considered a hybrid approach.

While FIG. 4D illustrates the simple case where each of the NDs 400A-H implements a single NE 470A-H, it should be understood that the network control approaches described with reference to FIG. 4D also work for networks where one or more of the NDs 400A-H implement multiple VNEs (e.g., VNEs 430A-R, VNEs 460A-R, those in the hybrid network device 406). Alternatively or in addition, the network controller 478 may also emulate the implementation of multiple VNEs in a single ND. Specifically, instead of (or in addition to) implementing multiple VNEs in a single ND, the network controller 478 may present the implementation of a VNE/NE in a single ND as multiple VNEs in the virtual networks 492 (all in the same one of the virtual network(s) 492, each in different ones of the virtual network(s) 492, or some combination). For example, the network controller 478 may cause an ND to implement a single VNE (a NE) in the underlay network, and then logically divide up the resources of that NE within the centralized control plane 476 to present different VNEs in the virtual network(s) 492 (where these different VNEs in the overlay networks are sharing the resources of the single VNE/NE implementation on the ND in the underlay network).

On the other hand, FIGS. 4E and 4F respectively illustrate exemplary abstractions of NEs and VNEs that the network controller 478 may present as part of different ones of the virtual networks 492. FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 4701 in one of the virtual network(s) 492 of FIG. 4D, according to some embodiments of the invention. FIG. 4E shows that in this virtual network, the NE 4701 is coupled to NE 470D and 470F, which are both still coupled to NE 470E.

FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention. Thus, the abstraction of a NE or VNE can span multiple NDs.

While some embodiments of the invention implement the centralized control plane 476 as a single entity (e.g., a single instance of software running on a single electronic device), alternative embodiments may spread the functionality across multiple entities for redundancy and/or scalability purposes (e.g., multiple instances of software running on different electronic devices).

Figure 5:
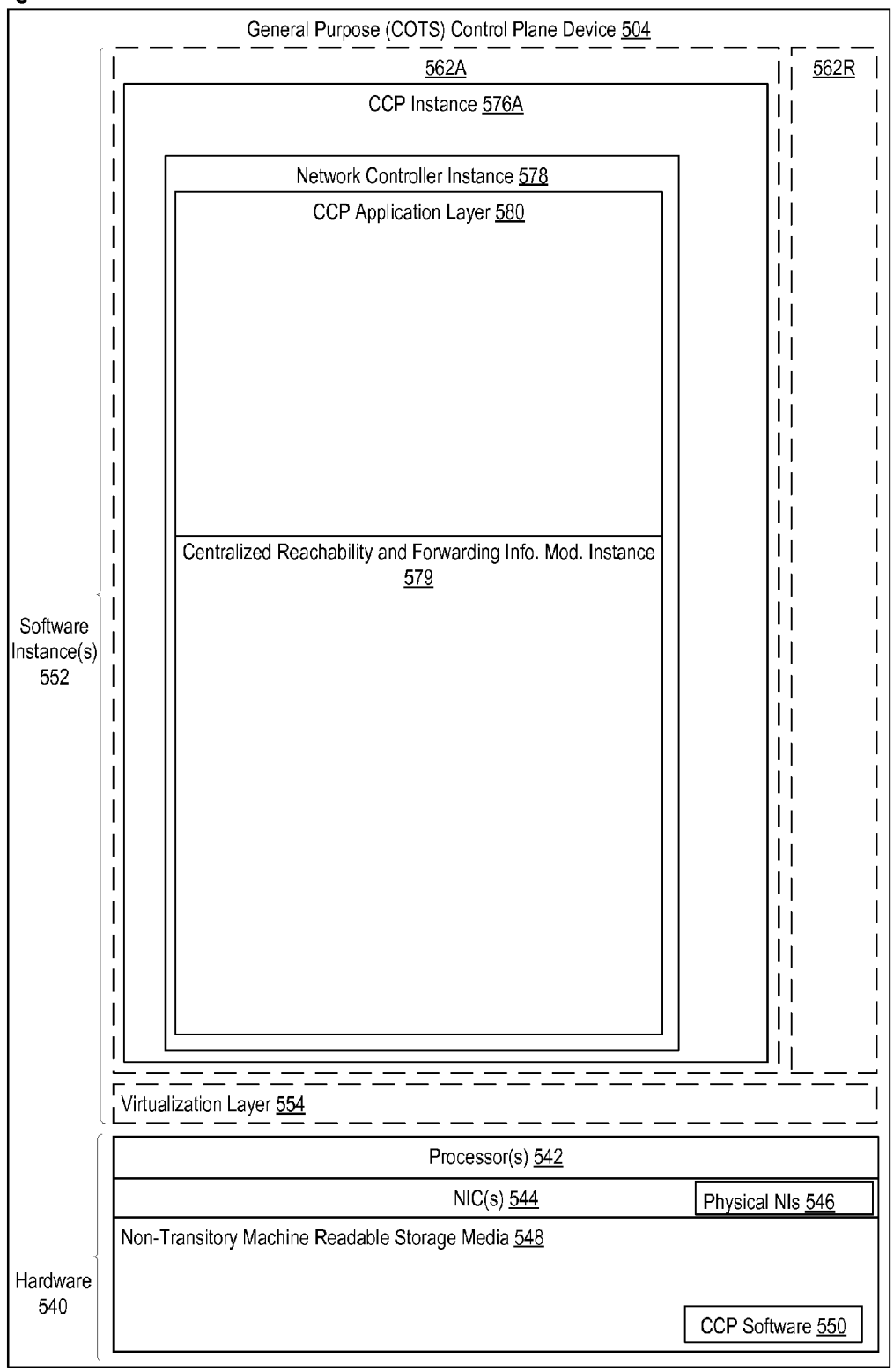
FIG. 5 illustrates a general purpose control plane device with centralized control plane (CCP) software), according to some embodiments of the invention.

Similar to the network device implementations, the electronic device(s) running the centralized control plane 476, and thus the network controller 478 including the centralized reachability and forwarding information module 479, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 5 illustrates, a general purpose control plane device 504 including hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein centralized control plane (CCP) software 550.

In embodiments that use compute virtualization, the processor(s) 542 typically execute software to instantiate a virtualization layer 554 and software container(s) 562A-R (e.g., with operating system-level virtualization, the virtualization layer 554 represents the kernel of an operating system (or a shim executing on a base operating system) that allows for the creation of multiple software containers 562A-R (representing separate user space instances and also called virtualization engines, virtual private servers, or jails) that may each be used to execute a set of one or more applications; with full virtualization, the virtualization layer 554 represents a hypervisor (sometimes referred to as a virtual machine monitor (VMM)) or a hypervisor executing on top of a host operating system, and the software containers 562A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 550 (illustrated as CCP instance 576A) is executed within the software container 562A on the virtualization layer 554. In embodiments where compute virtualization is not used, the CCP instance 576A on top of a host operating system is executed on the "bare metal" general purpose control plane device 504. The instantiation of the CCP instance 576A, as well as the virtualization layer 554 and software containers 562A-R if implemented, are collectively referred to as software instance(s) 552.

In some embodiments, the CCP instance 576A includes a SDN network controller instance 578. The network controller instance 578 includes a centralized reachability and forwarding information module instance 579 (which is a middleware layer providing the context of the network controller 478 to the operating system and communicating with the various NEs), and an CCP application layer 580 (sometimes referred to as an application layer) over the middleware layer (providing the intelligence required for various network operations such as protocols, network situational awareness, and user-interfaces). At a more abstract level, this CCP application layer 580 within the centralized control plane 476 works with virtual network view(s) (logical view(s) of the network) and the middleware layer provides the conversion from the virtual networks to the physical view.

The centralized control plane 476 transmits relevant messages to the data plane 480 based on CCP application layer 580 calculations and middleware layer mapping for each flow. A flow may be defined as a set of packets whose headers match a given pattern of bits; in this sense, traditional IP forwarding is also flow-based forwarding where the flows are defined by the destination IP address for example;

however, in other implementations, the given pattern of bits used for a flow definition may include more fields (e.g., 10 or more) in the packet headers. Different NDs/NEs/VNEs of the data plane 480 may receive different messages, and thus different forwarding information. The data plane 480 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 480, the packet (or a subset of the packet header and content) is typically forwarded to the centralized control plane 476. The centralized control plane 476 will then program forwarding table entries into the data plane 480 to accommodate packets belonging to the flow of the unknown packet. Once a specific forwarding table entry has been programmed into the data plane 480 by the centralized control plane 476, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a first network device, for optimizing placement of probes, the method comprising:
receiving a plurality of requests comprising of monitoring zones (MZs), wherein each MZ identifies a traffic path to be monitored in a network and each MZ is to be allocated a pair of probes in the network, wherein each MZ is associated with a rule identifying traffic that is to cause its probes to be incremented or decremented, and wherein each probe in the network is associated with a rule identifying traffic that is to cause the corresponding probe to be incremented or decremented;
determining whether one or more previously allocated pairs of probes in the network can serve as probes for one or more MZs in the plurality of requests, wherein a previously allocated pair of probes in the network can serve as probes for a MZ if a rule associated with the MZ can be consolidated with rules associated with the previously allocated pair of probes;
for each MZ that can be served by a previously allocated pair of probes, sending information identifying the MZ and the previously allocated pair of probes that can serve it;
identifying, among MZs that cannot be served by previously allocated pairs of probes, a first set of MZs comprising a first MZ and a second MZ that can be consolidated with each other, wherein MZs can be consolidated if a rule associated with an MZ can be consolidated with a rule associated with another MZ;
determining unallocated probes in the network that can serve as probes for the first MZ and the second MZ; and
sending information identifying the first MZ, the second MZ, and the unallocated probes in the network that can serve as probes for the first MZ and the second MZ.

2. The method of claim 1, further comprising:
identifying, for the first MZ in the first set of MZs, a first list of one or more unallocated pairs of probes in the network that can serve as probes of the first MZ; and
identifying, for the second MZ in the first set of MZs, a second list of one or more unallocated pairs of probes in the network that can serve as probes of the second MZ, wherein at least one unallocated pair of probes in the second list of one or more unallocated pairs of probes is associated with a rule that is same as a rule associated with an unallocated pair of probes in the first list of one or more unallocated pairs of probes.

3. The method of claim 2, further comprising:
identifying a first group of one or more combinations of the first and second MZs included in the first set of MZs, wherein each combination includes an unallocated pair of probes from the first list of one or more unallocated pairs of probes and an unallocated pair of probes from the second list of one or more unallocated pairs of probes.

4. The method of claim 3, further comprising:
determining a cost for each combination in the first group of one or more combinations by adding costs associated with each probe in the combination, wherein a cost of only one probe is added when a plurality of probes can be consolidated, wherein probes can be consolidated if they are associated with same rules; and
identifying, from the first group of one or more combinations of MZs, a first combination that has a lowest cost.

5. The method of claim 4, further wherein the information identifying the first MZ, the second MZ, and the unallocated probes in the network that can serve as probes for the first MZ and the second MZ is sent
in response to determining the first combination of MZs with the lowest cost includes consolidated probes, and wherein the unallocated probes are consolidated probes that can serve as probes of the first and second MZ.

6. The method of claim 5, further comprising:
identifying, among MZs that cannot be served by previously allocated pairs of probes, a second set of MZs comprising of a third MZ and a fourth MZ that cannot be consolidated with each other, wherein MZs cannot be consolidated if a rule associated with an MZ cannot be consolidated with a rule associated with another MZ;
identifying, for the third MZ in the second set of MZs, a third list of one or more unallocated pairs of probes in the network that can serve as probes of the third MZ; and
identifying, for the fourth MZ in the second set of MZs, a fourth list of one or more unallocated pairs of probes in the network that can serve as probes of the fourth MZ.

7. The method of claim 6, further comprising:
identifying a second group of one or more combinations of the third and fourth MZs included in the second set of MZs, wherein each combination includes an unallocated pair of probes from the third list of one or more unallocated pairs of probes and an unallocated pair of probes from the fourth list of one or more unallocated pairs of probes.

8. The method of claim 7, further comprising:
determining a cost for each combination in the second group of one or more combinations by adding costs associated with each probe in the combination; and
identifying, from the second group of one or more combinations of MZs, a second combination that has a lowest cost.

9. The method of claim 8, further comprising:
in response to determining the second combination of MZs has the lowest cost, sending information identifying the third MZ, the fourth MZ, and the unallocated probes in the second combination that can serve as probes of the third and fourth MZ.

10. The method of claim 1, further comprising:
for each request in the plurality of requests, in response to determining at least one MZ in the request cannot be allocated a pair of unallocated probes in the network, sending information identifying the request and the at least one MZ.

11. A first network device, for optimizing placement of probes, the first network device comprising:
a set of one or more processors; and
a non-transitory machine-readable storage medium containing code, which when executed by the set of one or more processors, causes the first network device to:
receive a plurality of requests comprising of monitoring zones (MZs), wherein each MZ identifies a traffic path to be monitored in a network and each MZ is to be allocated a pair of probes in the network, wherein each MZ is associated with a rule identifying traffic that is to cause its probes to be incremented or decremented, and wherein each probe in the network is associated with a rule identifying traffic that is to cause the corresponding probe to be incremented or decremented, determine whether one or more previously allocated pairs of probes in the network can serve as probes for one or more MZs in the plurality of requests, wherein a previously allocated pair of probes in the network can serve as probes for a MZ if a rule associated with the MZ can be consolidated with rules associated with the previously allocated pair of probes, for each MZ that can be served by a previously allocated pair of probes, send information identifying the MZ and the previously allocated pair of probes that can serve it, identify, among MZs that cannot be served by previously allocated pairs of probes, a first set of MZs comprising a first MZ and a second MZ that can be consolidated with each other, wherein MZs can be consolidated if a rule associated with an MZ can be consolidated with a rule associated with another MZ, determine unallocated probes in the network that can serve as probes for the first MZ and the second MZ, and send information identifying the first MZ, the second MZ, and the unallocated probes in the network that can serve as probes for the first MZ and the second MZ.

12. The first network device of claim 11, wherein the non-transitory machine-readable storage medium further contains code, which when executed by the set of one or more processors, causes the first network device to:

identify, for the first MZ in the first set of MZs, a first list of one or more unallocated pairs of probes in the network that can serve as probes of the first MZ; and identify, for the second MZ in the first set of MZs, a second list of one or more unallocated pairs of probes in the network that can serve as probes of the second MZ, wherein at least one unallocated pair of probes in the second list of one or more unallocated pairs of probes is associated with a rule that is same as a rule associated with an unallocated pair of probes in the first list of one or more unallocated pairs of probes.

13. The first network device of claim 12, wherein the non-transitory machine-readable storage medium further contains code, which when executed by the set of one or more processors, causes the first network device to:

identify a first group of one or more combinations of the first and second MZs included in the first set of MZs, wherein each combination includes an unallocated pair of probes from the first list of one or more unallocated pairs of probes and an unallocated pair of probes from the second list of one or more unallocated pairs of probes.

14. The first network device of claim 13, wherein the non-transitory machine-readable storage medium further contains code, which when executed by the set of one or more processors, causes the first network device to:

determine a cost for each combination in the first group of one or more combinations by adding costs associated with each probe in the combination, wherein a cost of only one probe is added when a plurality of probes can be consolidated, wherein probes can be consolidated if they are associated with same rules; and identify, from the first group of one or more combinations of MZs, a first combination that has a lowest cost.

15. The first network device of claim 14, wherein the information identifying the first MZ, the second MZ, and the unallocated probes in the network that can serve as probes for the first MZ and the second MZ is sent in response to determining the first combination of MZs with the lowest cost includes consolidated probes, and wherein the unallocated probes are consolidated probes that can serve as probes of the first and second MZ.

16. The first network device of claim 15, wherein the non-transitory machine-readable storage medium further contains code, which when executed by the set of one or more processors, causes the first network device to:

identify, among MZs that cannot be served by previously allocated pairs of probes, a second set of MZs comprising of a third MZ and a fourth MZ that cannot be consolidated with each other, wherein MZs cannot be consolidated if a rule associated with an MZ cannot be consolidated with a rule associated with another MZ;

identify, for the third MZ in the second set of MZs, a third list of one or more unallocated pairs of probes in the network that can serve as probes of the third MZ; and identify, for the fourth MZ in the second set of MZs, a fourth list of one or more unallocated pairs of probes in the network that can serve as probes of the fourth MZ.

17. The first network device of claim 16, wherein the non-transitory machine-readable storage medium further contains code, which when executed by the set of one or more processors, causes the first network device to:

identify a second group of one or more combinations of the third and fourth MZs included in the second set of MZs, wherein each combination includes an unallocated pair of probes from the third list of one or more unallocated pairs of probes and an unallocated pair of probes from the fourth list of one or more unallocated pairs of probes.

18. The first network device of claim 17, wherein the non-transitory machine-readable storage medium further contains code, which when executed by the set of one or more processors, causes the first network device to:

determine a cost for each combination in the second group of one or more combinations by adding costs associated with each probe in the combination; and identify, from the second group of one or more combinations of MZs, a second combination that has a lowest cost.

19. The first network device of claim 18, wherein the non-transitory machine-readable storage medium further contains code, which when executed by the set of one or more processors, causes the first network device to:

in response to determining the second combination of MZs has the lowest cost, send information identifying the third MZ, the fourth MZ, and the unallocated probes in the second combination that can serve as probes of the third and fourth MZ.

20. The first network device of claim 11, wherein the non-transitory machine-readable storage medium further contains code, which when executed by the set of one or more processors, causes the first network device to:

for each request in the plurality of requests, in response to determining at least one MZ in the request cannot be allocated a pair of unallocated probes in the network, send information identifying the request and the at least one MZ.

21. A non-transitory machine-readable storage medium having computer code stored therein, which when executed by a set of one or more processors of a first network device, for optimizing placement of probes, causes the first network device to perform operations comprising:

receiving a plurality of requests comprising of monitoring zones (MZs), wherein each MZ identifies a traffic path to be monitored in a network and each MZ is to be allocated a pair of probes in the network, wherein each MZ is associated with a rule identifying traffic that is to cause its probes to be incremented or decremented, and wherein each probe in the network is associated with a rule identifying traffic that is to cause the corresponding probe to be incremented or decremented;

determining whether one or more previously allocated pairs of probes in the network can serve as probes for one or more MZs in the plurality of requests, wherein a previously allocated pair of probes in the network can serve as probes for a MZ if a rule associated with the MZ can be consolidated with rules associated with the previously allocated pair of probes;

for each MZ that can be served by a previously allocated pair of probes, sending information identifying the MZ and the previously allocated pair of probes that can serve it;

identifying, among MZs that cannot be served by previously allocated pairs of probes, a first set of MZs comprising a first MZ and a second MZ that can be consolidated with each other, wherein MZs can be consolidated if a rule associated with an MZ can be consolidated with a rule associated with another MZ;

determining unallocated probes in the network that can serve as probes for the first MZ and the second MZ; and sending information identifying the first MZ, the second MZ, and the unallocated probes in the network that can serve as probes for the first MZ and the second MZ.

22. The non-transitory machine-readable storage medium of claim 21, further comprising:
identifying, for the first MZ in the first set of MZs, a first list of one or more unallocated pairs of probes in the network that can serve as probes of the first MZ; and
identifying, for the second MZ in the first set of MZs, a second list of one or more unallocated pairs of probes in the network that can serve as probes of the second MZ, wherein at least one unallocated pair of probes in the second list of one or more unallocated pairs of probes is associated with a rule that is same as a rule associated with an unallocated pair of probes in the first list of one or more unallocated pairs of probes.

23. The non-transitory machine-readable storage medium of claim 22, further comprising:
identifying a first group of one or more combinations of the first and second MZs included in the first set of MZs, wherein each combination includes an unallocated pair of probes from the first list of one or more unallocated pairs of probes and an unallocated pair of probes from the second list of one or more unallocated pairs of probes.

24. The non-transitory machine-readable storage medium of claim 23, further comprising:
determining a cost for each combination in the first group of one or more combinations by adding costs associated with each probe in the combination, wherein a cost of only one probe is added when a plurality of probes can be consolidated, wherein probes can be consolidated if they are associated with same rules; and
identifying, from the first group of one or more combinations of MZs, a first combination that has a lowest cost.

25. The non-transitory machine-readable storage medium of claim 24, wherein the information identifying the first MZ, the second MZ, and the unallocated probes in the network that can serve as probes for the first MZ and the second MZ is sent
in response to determining the first combination of MZs with the lowest cost includes consolidated probes, and wherein the unallocated probes are consolidated probes that can serve as probes of the first and second MZ.

26. The non-transitory machine-readable storage medium of claim 25, further comprising:
identifying, among MZs that cannot be served by previously allocated pairs of probes, a second set of MZs comprising of a third MZ and a fourth MZ that cannot be consolidated with each other, wherein MZs cannot be consolidated if a rule associated with an MZ cannot be consolidated with a rule associated with another MZ;
identifying, for the third MZ in the second set of MZs, a third list of one or more unallocated pairs of probes in the network that can serve as probes of the third MZ; and
identifying, for the fourth MZ in the second set of MZs, a fourth list of one or more unallocated pairs of probes in the network that can serve as probes of the fourth MZ.

27. The non-transitory machine-readable storage medium of claim 26, further comprising:
identifying a second group of one or more combinations of the third and fourth MZs included in the second set of MZs, wherein each combination includes an unallocated pair of probes from the third list of one or more unallocated pairs of probes and an unallocated pair of probes from the fourth list of one or more unallocated pairs of probes.

28. The non-transitory machine-readable storage medium of claim 27, further comprising:
determining a cost for each combination in the second group of one or more combinations by adding costs associated with each probe in the combination; and
identifying, from the second group of one or more combinations of MZs, a second combination that has a lowest cost.

29. The non-transitory machine-readable storage medium of claim 28, further comprising:
in response to determining the second combination of MZs has the lowest cost, sending information identifying the third MZ, the fourth MZ, and the unallocated probes in the second combination that can serve as probes of the third and fourth MZ.

30. The non-transitory machine-readable storage medium of claim 21, further comprising:
for each request in the plurality of requests, in response to determining at least one MZ in the request cannot be allocated a pair of unallocated probes in the network, sending information identifying the request and the at least one MZ.

* * * * *